(12) United States Patent
Ikeda et al.

(10) Patent No.: US 9,261,684 B2
(45) Date of Patent: Feb. 16, 2016

(54) ZOOM LENS AND IMAGING APPARATUS

(71) Applicant: FUJIFILM Corporation, Tokyo (JP)

(72) Inventors: Shinkichi Ikeda, Saitama-ken (JP); Toshihiro Aoi, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/564,755

(22) Filed: Dec. 9, 2014

(65) Prior Publication Data

US 2015/0092280 A1 Apr. 2, 2015

Related U.S. Application Data

(63) Continuation of application No. PCT/JP2013/003334, filed on May 27, 2013.

(30) Foreign Application Priority Data

Jun. 12, 2012 (JP) .................................. 2012-132860

(51) Int. Cl.
*G02B 15/14* (2006.01)
*G02B 15/173* (2006.01)
*G02B 15/20* (2006.01)
*G02B 13/18* (2006.01)

(52) U.S. Cl.
CPC .............. *G02B 15/173* (2013.01); *G02B 15/20* (2013.01); *G02B 13/18* (2013.01)

(58) Field of Classification Search
CPC ...... G02B 15/173; G02B 15/20; G02B 15/14; G02B 15/16; G02B 13/18
See application file for complete search history.

(56) References Cited

U.S. PATENT DOCUMENTS

| 5,561,560 | A | 10/1996 | Tsutsumi |
| 5,790,316 | A | 8/1998 | Terasawa et al. |
| 6,084,721 | A | 7/2000 | Terasawa |
| 6,282,032 | B1 | 8/2001 | Tomita |
| 2009/0128923 | A1* | 5/2009 | Toyama ............... G02B 15/173 359/683 |

(Continued)

FOREIGN PATENT DOCUMENTS

| JP | 07-248449 | 9/1995 |
| JP | 07-294814 | 11/1995 |
| JP | 08-82741 | 3/1996 |

(Continued)

OTHER PUBLICATIONS

International Search Report, PCT/JP2013/003334, Aug. 20, 2013.

*Primary Examiner* — Joseph P Martinez
(74) *Attorney, Agent, or Firm* — Young & Thompson

(57) ABSTRACT

The zoom lens substantially consists of a positive first lens group fixed while changing magnification, a negative second lens group which moves from the object side to the image side while changing magnification, a positive third lens group which moves while changing magnification, and a positive fourth lens group which moves from the image side to the object side while changing magnification, and a positive fifth lens group fixed while changing magnification in this order from the object side. A floating system in which the third lens group and the fourth lens group move relative to each other while changing magnification is adopted. The image formation magnification rates of the combined lens group formed by the third lens group and the fourth lens group together and the second lens group simultaneously pass $-1\times$ point while changing magnification from the wide angle end to the telephoto end.

14 Claims, 33 Drawing Sheets

(56) References Cited

U.S. PATENT DOCUMENTS

2010/0085647 A1 4/2010 Nurishi
2011/0038055 A1 2/2011 Nurishi

FOREIGN PATENT DOCUMENTS

| JP | 10-161026 | 6/1998 |
|----|-----------|--------|
| JP | 11-160620 | 6/1999 |
| JP | 2000-121939 | 4/2000 |
| JP | 2009-128491 | 6/2009 |
| JP | 2009-128492 | 6/2009 |
| JP | 2010-091788 | 4/2010 |
| JP | 2011-039399 | 2/2011 |

* cited by examiner

FIG.9 EXAMPLE 1

FIG.15 EXAMPLE 3

ZOOM LENS AND IMAGING APPARATUS

CROSS-REFERENCE TO RELATED APPLICATIONS

This application is a Continuation of PCT International Application No. PCT/JP2013/003334 filed on May 27, 2013, which claims priority under 35 U.S.C. §119(a) to Japanese Patent Application No. 2012-132860 filed on Jun. 12, 2012. Each of the above application(s) is hereby expressly incorporated by reference, in its entirety, into the present application.

BACKGROUND OF THE INVENTION

1. Technical Field

The present invention relates to a zoom lens and an imaging apparatus, and particularly to a zoom lens having a high magnification ratio suitable for mounting onto TV cameras, video cameras, and the like and an imaging apparatus including this zoom lens.

2. Description of the Related Art

Conventionally, zoom lenses of a three-group configuration in which three groups move while changing magnification to have higher performance are known as the zoom lenses to be mounted onto a TV camera, a video camera, and the like (Patent Documents 1 and 2 (Japanese Unexamined Patent Publication No. 7(1995)-248449 and Japanese Unexamined Patent Publication No. 2009-128491)). Further, zoom lenses of a two-group configuration in which two group move while changing magnification are known as zoom lenses having high magnification of 100× or more (Patent Documents 3 and 4 (Japanese Unexamined Patent Publication No. 2010-091788 and Japanese Unexamined Patent Publication No. 2011-039399)).

SUMMARY OF THE INVENTION

Increasing magnification in a zoom lens will increase the amount of movement of lens groups while changing magnification. This will make the distance between a stop and the most-object-side lens longer. Thereby, when a wider angle of view is achieved, the lens system will become larger and the weight thereof will also increase. This makes it difficult to widen the angle of view. For example, all of the zoom lenses disclosed in Patent Documents 1 through 4 have the angles of view of 65 or less degree at the wide angle end, and widening of the angle of view is not achieved.

Meanwhile, configuring the most-image-side lens group to be complicated to achieve a wider angle of view will increase the weight of the lens system. This makes it difficult to increase magnification ratio. For example, in the zoom lens disclosed in Patent Document 2 mentioned above, the angle of view is widened, but the zoom ratio is not significantly great.

The present invention has been developed in view of the above circumstances. It is an object of the present invention to provide a zoom lens having high magnification in which compactness is maintained while enabling increasing the magnification to 100× or more and widening the angle of view; and an imaging apparatus with this zoom lens mounted thereon.

A zoom lens of the present invention substantially consists of:

a first lens group having a positive refractive power, which is fixed while changing magnification;

a second lens group having a negative refractive power, which moves from the object side to the image side while changing magnification from the wide angle end to the telephoto end;

a third lens group having a positive refractive power, which moves while changing magnification;

a fourth lens group having a positive refractive power, which moves from the image side to the object side while changing magnification from the wide angle end to the telephoto end; and a fifth lens group having a positive refractive power, which is fixed while changing magnification; wherein the third lens group and the fourth lens group move relative to each other while changing magnification;

image formation magnification rates of a combined lens group formed by combining the third lens group and the fourth lens group together and the second lens group simultaneously pass a −1× point when changing magnification from the wide angle end to the telephoto end; and conditional formula (1) below is satisfied:

$$(Dg34max - Dg34min)/fw > 2.5 \qquad (1),\text{ where}$$

fw: the focal length at the wide angle end,

Dg34max: the maximum value of the distance between the third lens group and the fourth lens group while changing magnification, and Dg34min: the minimum value of the distance between the third lens group and the fourth lens group while changing magnification.

The zoom lens of the present invention substantially consists of five lens groups. However, lenses substantially without any refractive power; optical elements other than lenses such as stops, cover glasses, filters, and the like; lens flanges; lens barrels; imaging elements; and mechanical components such as camera shake correction mechanisms may be included in addition to the five lens groups.

Further, the "lens group" intends to include not only configurations constituted by a plurality of lenses but also configurations constituted by one lens.

In the present invention, surface shapes of lenses, such as a convex surface, a concave surface, a planar surface, biconcave, meniscus, biconvex, plano-convex, plano-concave, and the like; and signs of the refractive powers of lenses, such as positive and negative, should be considered in a paraxial region if aspheric surfaces are included therein, unless otherwise noted. Moreover, in the present invention, the sign of the radius of curvature is positive in the case that a surface shape is convex on the object side, and negative in the case that the surface shape is convex on the image side. Note that it is preferable for conditional formula (1-1) below to be satisfied:

$$(Dg34max - Dg34min)/fw > 3.0 \qquad (1-1).$$

Further, it is preferable for the zoom lens of the present invention to satisfy conditional formula (2) below:

$$(Dg34max - Dg34min)/f3 > 0.10 \qquad (2)$$

f3: the focal length of the third lens group,

Dg34max: the maximum value of the distance between the third lens group and the fourth lens group while changing magnification, and Dg34min: the minimum value of the distance between the third lens group and the fourth lens group while changing magnification.

Note that it is preferable for conditional formula (2-1) below to be satisfied:

$$(Dg34max - Dg34min)/f3 > 0.15 \qquad (2-1).$$

Further, in the zoom lens of the present invention, it is preferable for the distance between the third lens group and the fourth lens group to be maximum at a point more toward the wide angle side than a point where the image formation magnification rate of the combined lens group becomes −1× while changing magnification.

Further, in the zoom lens of the present invention, it is preferable for the distance between the third lens group and the fourth lens group to be minimum at the telephoto end.

Further, in the zoom lens of the present invention, it is preferable for at least one surface of the lens which constitutes the third lens group to be an aspherical surface. Further, in the zoom lens of the present invention, it is preferable for the most-image-side lens among the lenses which constitute the fourth lens group to be an aspherical surface lens.

Further, in the zoom lens of the present invention, it is preferable for the first lens group to substantially consist of a first lens having a negative refractive power, a second lens having a positive refractive power, a third lens having a positive refractive power, a fourth lens having a positive refractive power, and a fifth lens having a positive meniscus shape with a convex surface toward the object side.

Further, in the zoom lens of the present invention, it is preferable for the most-object-side lens among the lenses which constitute the second lens group to have a negative refractive power.

Further, in the zoom lens of the present invention, it is preferable for the third lens group to substantially consist of one lens having a positive refractive power.

Further, in the zoom lens of the present invention, it is preferable for the fourth lens group to substantially consist of three or more lenses having positive refractive powers and one or more lenses having negative refractive powers.

Further, in the zoom lens of the present invention, it is preferable for the most-object-side surface among the lenses which constitute the second lens group to be aspherical.

An imaging apparatus of the present invention is provided with the zoom lens of the present invention described above.

According to the present invention, the configuration of each lens group is suitably set in a zoom lens of a five-group configuration. Further, the zoom lens adopts a floating system in which the third lens group G3 and the fourth lens group G4 correct variations in the imaging plane due to changes in magnification with respect to the second lens group G2 which operates to change magnification particularly when changing magnification, and the third lens group G3 and the fourth lens group G4 move relative to each other. Therefore, it becomes possible to favorably correct variations in the imaging plane while changing magnification and suppressing fluctuations in spherical aberration and comatic aberration while changing magnification. Further, image formation magnification rates β of the combined lens group formed by combining the third lens group G3 and the fourth lens group G4 together and the second lens group are configured to simultaneously pass a point while changing magnification from the wide angle end to the telephoto end. This enables a compact zoom lens having a high magnification ratio with fluctuations in aberrations suppressed satisfactorily to be achieved. Satisfying conditional formula (1) can suppress increase in the height of the rays on the wide angle side and enables a wider angle of view to be achieved.

The imaging apparatus of the present invention can achieve high magnification ratio as well as wider angle of view while maintaining high-vision image quality because the zoom lens of the present invention is mounted thereon.

DESCRIPTION OF THE PREFERRED EMBODIMENTS

Figure 1:
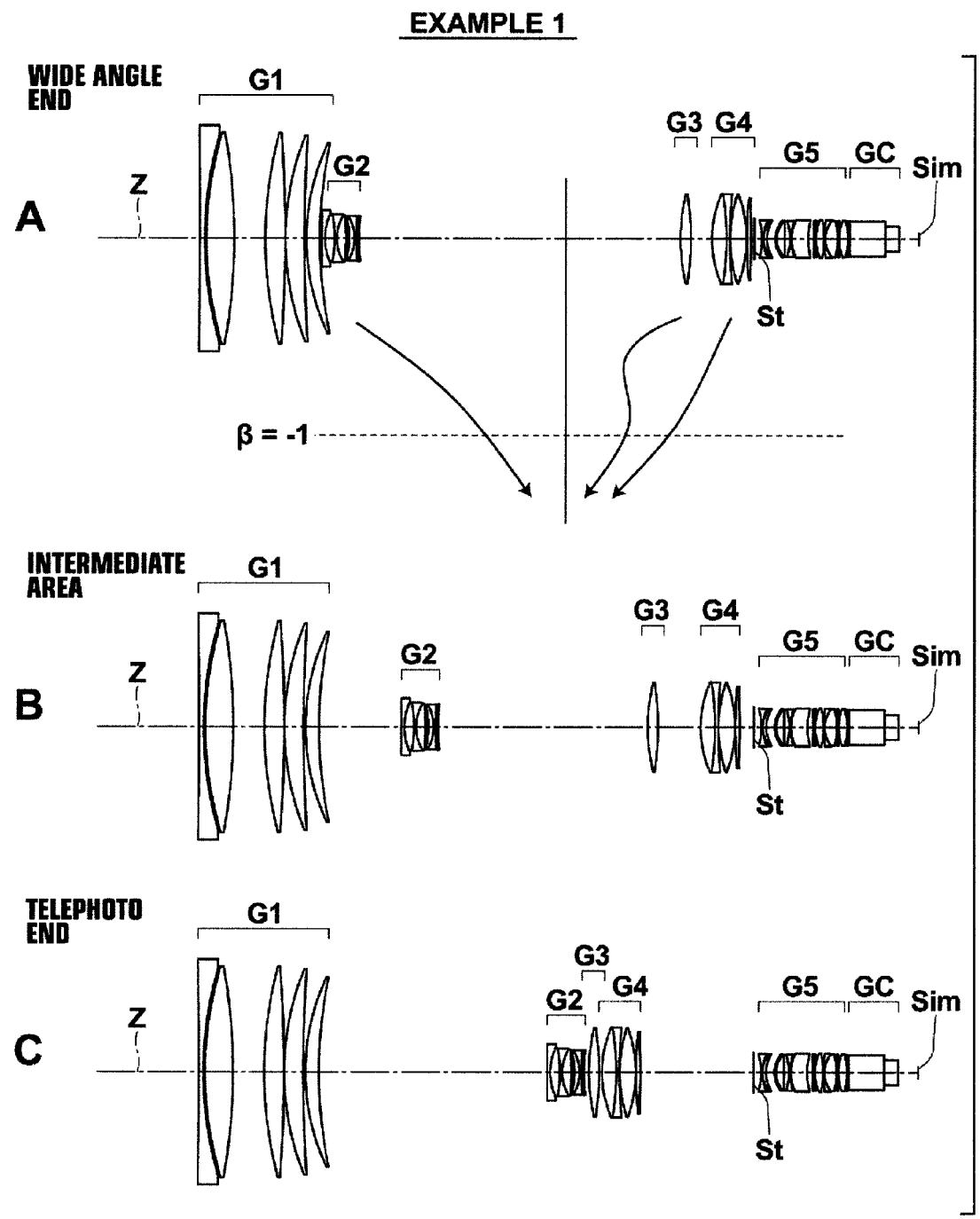
FIG. 1 is a collection of cross-sectional views of a zoom lens according to Example 1 of the present invention.

Hereinafter, embodiments of the present invention will be described in detail with reference to the accompanying drawings. Each of A, B, and C of FIG. 1 shows a configuration of the zoom lens according to one embodiment of the present invention. This configuration corresponds to a lens of Example 1 to be described later. Note that A of FIG. 1 corresponds to an arrangement of an optical system at the wide angle end (in the shortest focal length state), B of FIG. 1 corresponds to an arrangement of the optical system at the intermediate range (in the intermediate focal length state), and C of FIG. 1 corresponds to an arrangement of the optical system at the telephoto end (in the longest focal length state). Similarly, the second and the third examples of configurations respectively corresponding to lens configurations of Examples 2 and 3 to be described below are shown in A, B, and C of FIG. 2 and A, B, and C of FIG. 3, respectively.

Figure 2:
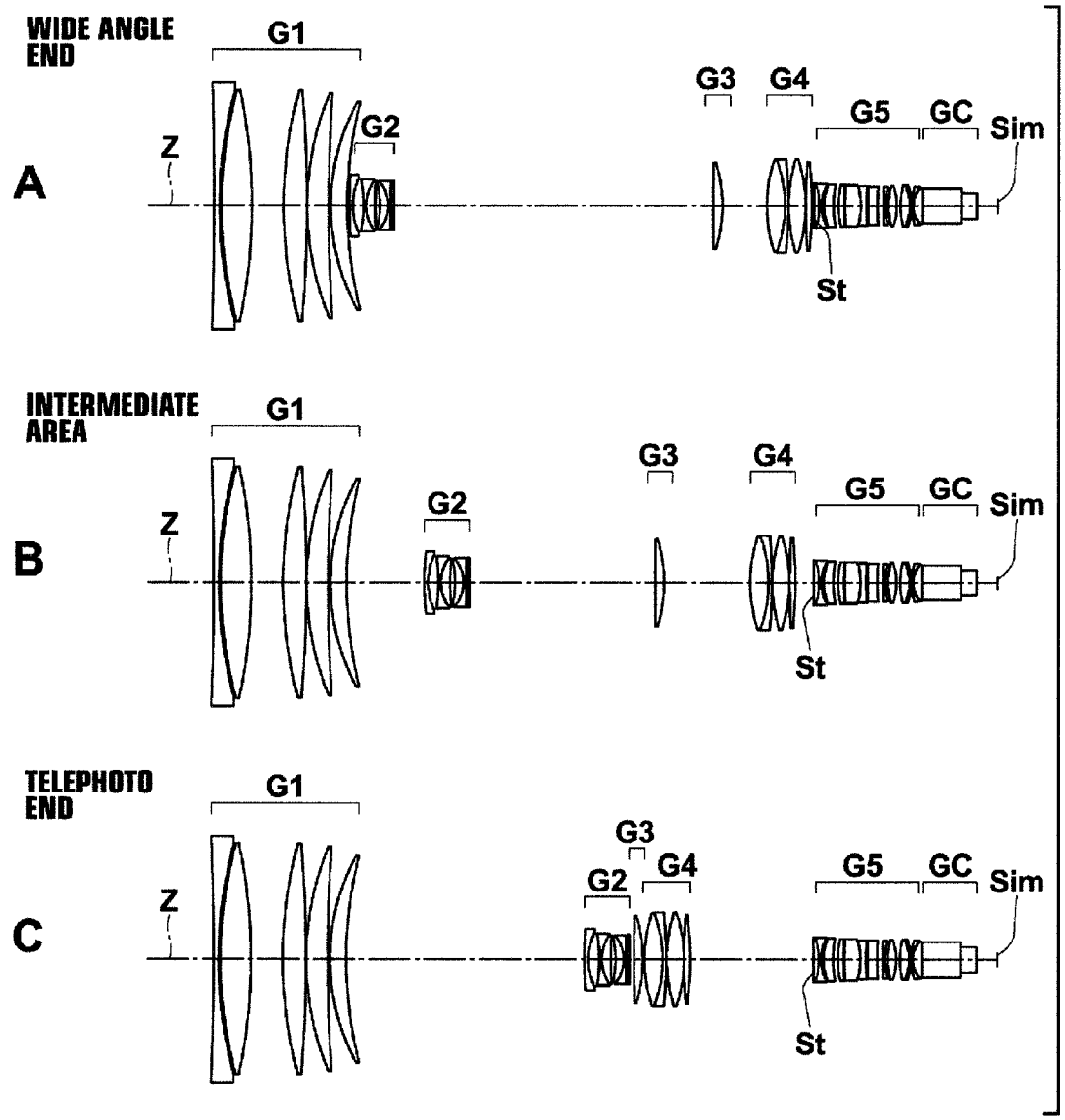
FIG. 2 is a collection of cross-sectional views of a zoom lens according to Example 2 of the present invention.
Figure 3:
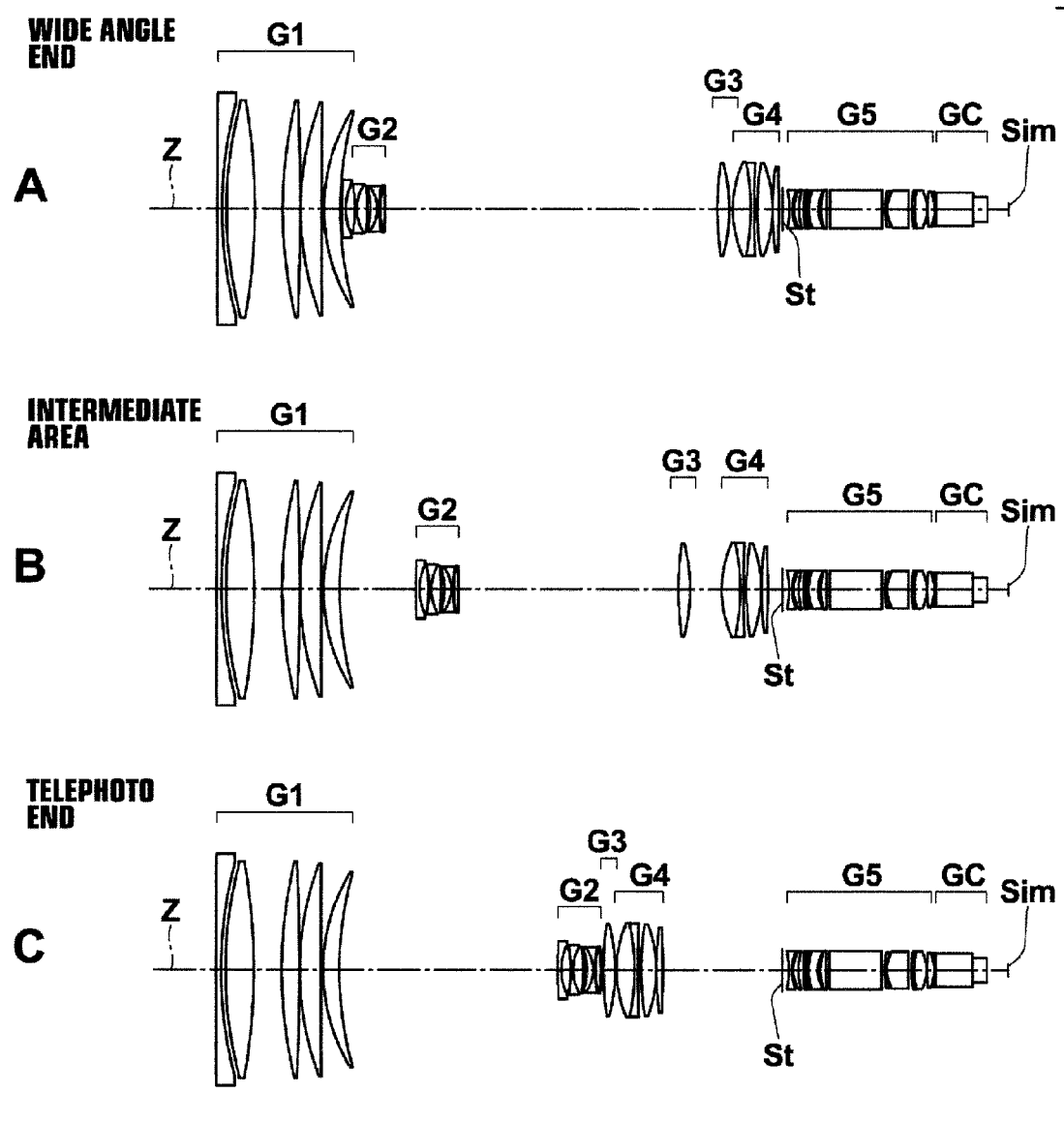
FIG. 3 is a collection of cross-sectional views of a zoom lens according to Example 3 of the present invention.

In all of the FIGS. 1 through 3, the left side is the object side, and the right side is the image side. The movement trajectory of each movable lens group when changing magnification from the wide angle end to the telephoto end is schematically indicated by arrows only in A of FIG. 1. The arrows illustrated in A of FIG. 1 correspond to the movement trajectories of the second lens group, the third lens group, and the fourth lens group in this order from the object side to be described later. Note that in the second and the third examples of configurations, the movement trajectory of each movable lens group is substantially the same as that of the first example of configuration. Accordingly, the movement trajectories in FIGS. 2 and 3 will be omitted.

The zoom lens of each embodiment of the present invention can be favorably applied for use in high-performance TV cameras, video cameras, and the like, each of which is provided with a solid imaging element. For example, the zoom lens of the present invention is suitable for the range from the standard to the telephoto area in which a magnification change ratio is greater than or equal to 100×.

This zoom lens consists of a first lens group G1 having a positive refractive power, which is fixed while changing magnification; a second lens group G2 having a negative refractive power, which moves from the object side to the image side while changing magnification from the wide angle end to the telephoto end; a third lens group G3 having a positive refractive power, which moves while changing magnification; a fourth lens group G4 having a positive refractive power, which moves from the image side to the object side while changing magnification from the wide angle end to the telephoto end; and a fifth lens group G5 having a positive refractive power, which includes an aperture stop St and which is fixed while changing magnification, in this order from the object side along the optical axis Z. Note that the aperture stop St does not necessarily represent the size or shape thereof, but represents the position thereof on the optical axis Z.

An imaging element (not shown) is disposed on the image formation surface (imaging surface) Sim of this zoom lens. Various kinds of optical members may be disposed between the fifth lens group G5 and the imaging surface according to the configurations of a camera on which the lens is mounted. In each of the examples of configurations shown in the Figures, a color separation optical system GC consisting of a color separation prism, and the like is disposed.

The second lens group G2, the third lens group G3, and the fourth lens group G4 are movable while changing magnification and are capable of functioning as a zooming group. The zoom lens of the present embodiment is configured to have an inner zooming system in which magnification is changed by moving groups which are not provided at the front end of the optical system but are provided in the interior of the optical system. Such an inner zooming system is more preferable for the TV cameras, video cameras, and the like because the inner zooming system involves little change in the total length and the weight balance while changing magnification and is superior in operability.

Among the zooming groups, the second lens group G2 functions as a variator group, and the third lens group G3 and the fourth lens group G4 function as a compensator group. More specifically, magnification is changed by moving the second lens group G2 along the optical axis, and variations in the imaging plane due to changes in magnification changes are corrected by moving the third lens group G3 and the fourth lens group G4 along the optical axis.

In particular, the zoom lens of the present embodiment adopts a floating system in which the third lens group G3 and the fourth lens group G4 move relative to each other when changing magnification. This configuration enables correcting variations in the imaging plane due to changes in magnification, correcting fluctuations in spherical aberration and comatic aberration satisfactorily when changing magnification, and holding favorable optical performance.

The zoom lens of the present embodiment is configured in such a manner that the image formation magnification rates of the combined lens formed by combining the third lens group G3 and the fourth lens group G4 together and the second lens group G2 simultaneously pass a −1× point β while changing magnification from the wide angle end to the telephoto end. This configuration enables lateral chromatic aberration to be corrected satisfactorily and enables a higher magnification to be achieved.

In the zoom lens of the present embodiment, it is preferable for the distance between the third lens group G3 and the fourth lens group G4 to be maximum at a point more toward the wide angle side than the point where the image formation magnification rate β of the combined lens group formed by combining the third lens group G3 and the fourth lens group G4 becomes −1×. This configuration causes the height of rays at the most-object-side lens to be increased toward the wide angle side than the point where the image formation magnification rate (3 of the combined lens. Therefore, configuring the distance between the third lens group G3 and the fourth lens group G4 to be maximum toward the wide angle side than the point where the image formation magnification rate β of the combined lens group enables a wider angle of view to be achieved effectively.

In the zoom lens of the present embodiment, it is preferable for the distance between the third lens group G3 and the fourth lens group G4 to be minimum at the telephoto end. This configuration causes the second lens group G2, the third lens group G3, and the fourth lens group G4 to come close to each other so that the refractive indexes can be made greater. Thereby, higher magnification can be achieved.

Figure 4:
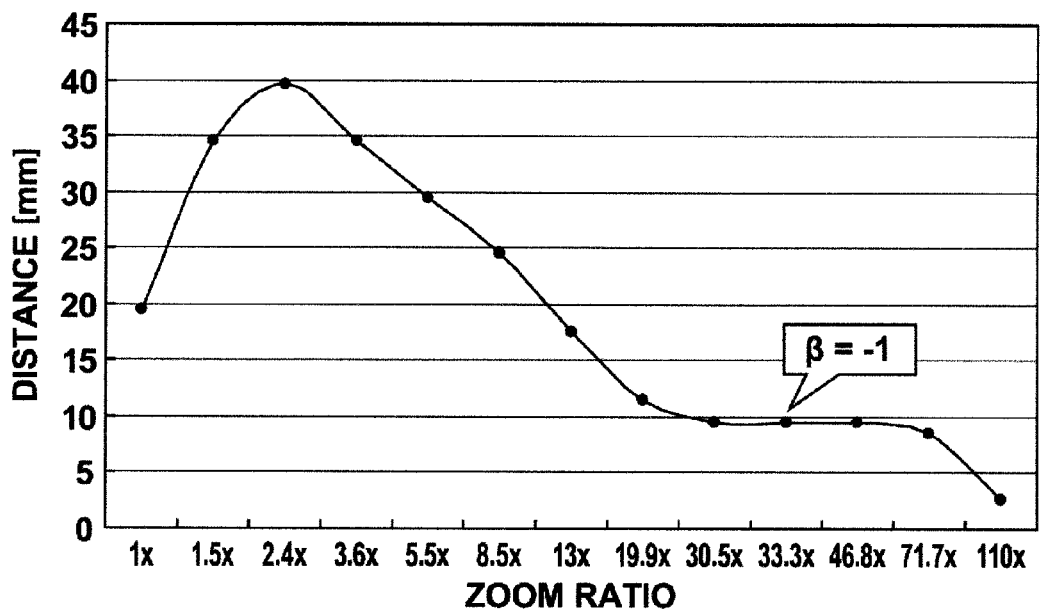
FIG. 4 is a diagram that illustrates the relationship between zoom ratios and the distances between the third lens group and the fourth lens group in the zoom lens according to Example 1 of the present invention.
Figure 5:
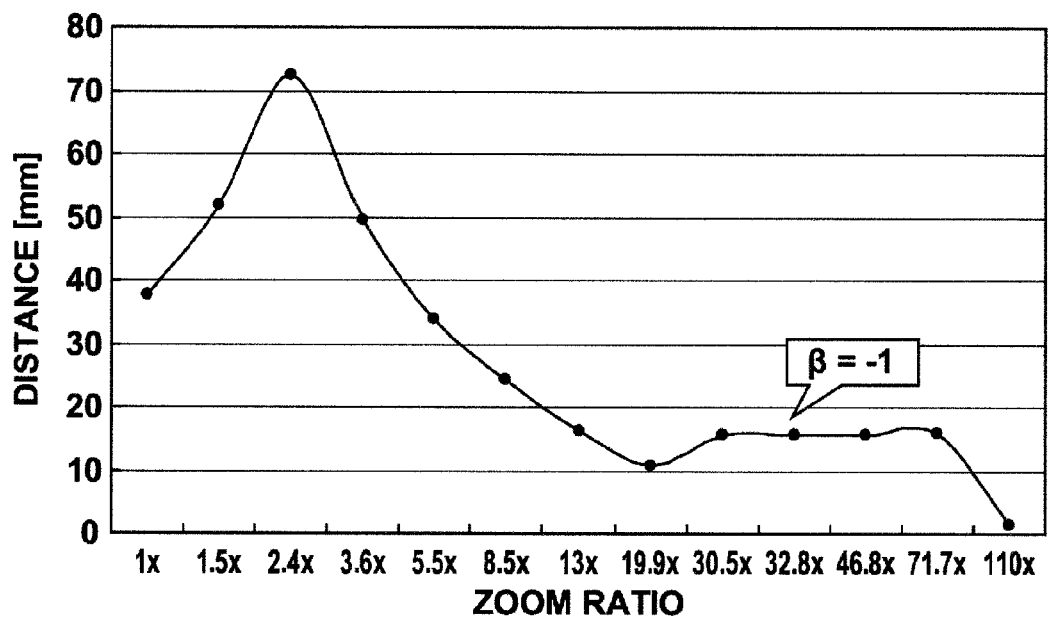
FIG. 5 is a diagram that illustrates the relationship between zoom ratios and the distances between the third lens group and the fourth lens group in the zoom lens according to Example 2 of the present invention.
Figure 6:
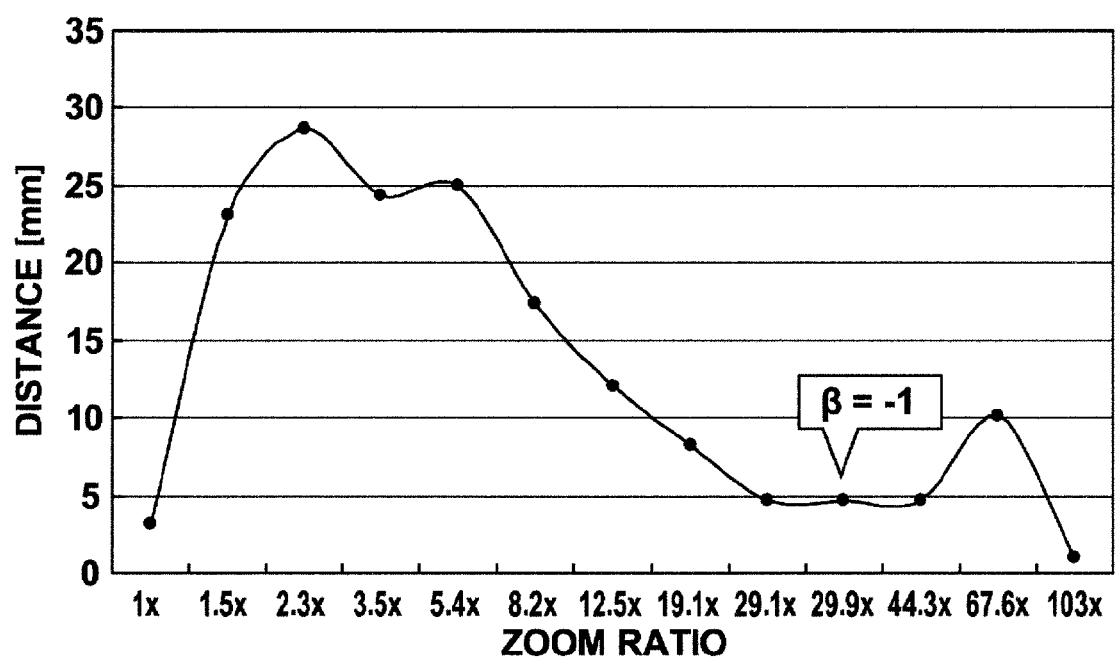
FIG. 6 is a diagram that illustrates the relationship between zoom ratios and the distances between the third lens group and the fourth lens group in the zoom lens according to Example 3 of the present invention.

Each of FIGS. 4 through 6 is a diagram that illustrates the relationship between zoom ratios and the distances between the third lens group G3 and the fourth lens group G4 in the first through the third examples of configurations. As shown in FIGS. 4 through 6, in the first through the third examples of configurations, the distance between the third lens group G3 and the fourth lens group G4 is configured to be maximum at a point more toward the wide angle side than a point where the image formation magnification rate of the combined lens group becomes −1× while changing magnification. Further, the distance between the third lens group G3 and the fourth lens group G4 is configured to be minimum at the telephoto end.

The first lens group G1 can be of a five-lens configuration in which a first lens having a negative refractive power, a second lens having a positive refractive power, a third lens having a positive refractive power, a fourth lens having a positive refractive power, and a fifth lens having a meniscus shape with a convex surface toward the object side are disposed in this order from the object side, as shown in the example of FIG. 1. This configuration enables the zoom lens of the present embodiment to have a good balance in performance and weight.

The second lens group G2 can be of a six-lens configuration in which a first lens having a negative refractive power, a cemented lens firmed by a second lens having a negative refractive power and a third lens having a positive refractive power together, a cemented lens firmed by a fourth lens having a positive refractive power and a fifth lens having a negative refractive power together, and a sixth lens having a negative refractive power, as shown in the example of configurations in FIG. 1. Configuring the most-object-side lens in the second lens group G2 to have a negative refractive power enables the second lens group G2 which functions as a variator group to be compact and enables a stroke necessary for changing magnification to be secured. Therefore, higher magnification can be achieved.

It is preferable for the second lens group G2 to have at least one aspherical surface and for this aspherical surface to be of the most-object-side lens having a negative refractive power within the second lens group G2. Configuring the second lens group G2 which moves when changing magnification to have an aspherical surface lens is advantageous from the viewpoint of correcting aberrations. Further, configuring the most-object-side lens having a negative refractive power in the zooming group to be an aspherical surface lens can provide a significant advantageous effect for correct aberrations.

The third lens group G3 can substantially consist of one lens having a positive refractive power as shown in the example of FIG. 1, for example. It can be understood from the movement trajectory in FIG. 1 that the third lens group G3 does not necessarily move in one direction from the image side to the object side while changing magnification from the wide angle end to the telephoto end, but there is a possibility for the third lens group G3 to move in the direction opposite thereto. The third lens group G3 which moves in such a manner gives a significant effect on operability. Therefore, it is preferable for the third lens group G3 to be light in weight to obtain favorable operability. Accordingly, it is preferable for the third lens group G3 to be constituted by a small number of lenses, more particularly by one lens having a positive refractive power.

Further, it is preferable for the third lens group G3 to have at least one aspherical surface. This configuration can make correction of spherical aberration and comatic aberration by employing the floating system more effective.

It is preferable for the fourth lens group G4 to substantially consist of at least three lenses having positive refractive powers and at least one lens having a negative refractive power. As shown in the example of FIG. 1, the fourth lens group can be of a four-lens configuration constituted by a cemented lens formed by a first lens having a positive refractive power and a second lens having a negative refractive power together and two lenses having positive refractive powers, i.e., a third lens and a fourth lens in this order from the object side. This enables lateral chromatic aberration at the telephoto end to be corrected satisfactorily.

Further, it is preferable for the fourth lens group G4 to have at least one aspherical surface and for this aspherical surface to be the object-side surface of the most-image-side lens having a positive refractive power in the fourth lens group G4. Configuring the fourth lens group G4 which moves when changing magnification to have an aspherical surface lens is advantageous from the viewpoint of correcting aberrations. Further, configuring the object-side surface of the most-image-side lens having a positive refractive power in the zooming group to be an aspherical surface can provide a significant advantageous effect for correcting aberrations. Particularly, spherical aberration, comatic aberration, and field curvature can be corrected satisfactorily.

Further, it is preferable for the fourth lens group G4 to have at least one aspherical surface, of a shape in which a positive refractive power becomes weaker toward the periphery from the optical axis. This configuration is advantageous from the viewpoint of suppressing fluctuations in various aberrations while changing magnification.

The fifth lens group G5 functions as a relay (a master) group. For example, as shown in the example of FIG. 1, the fifth lens group G5 can be of a thirteen-lens configuration in which an aperture stop St; a first lens having a negative refractive power; a second lens having a positive refractive power; a third lens having a negative refractive power; a fourth lens having a positive refractive power; a fifth lens having a negative refractive power; a sixth lens having a positive refractive power; a seventh lens having a negative refractive power; an eighth lens having a positive refractive power; a cemented lens formed by a ninth lens having a negative refractive power and a tenth lens having a positive refractive power together; an optical filter; and a cemented lens formed by an eleventh lens having a positive refractive power and a twelfth lens having a negative refractive power together in this order from the object side. Note that the optical filter between the tenth lens and the eleventh lens may be substituted for an optical member such as a sharp-cut filter which prevents color bleeding from being generated at the short wavelength side due to overexposure.

The zoom lens of the present embodiment is configured to satisfy conditional formula (1) below:

$$(Dg34max-Dg34min)/fw>2.5 \qquad (1),$$ where fw: the focal length of the wide angle end,
g34max: the maximum value of the distance between the third lens group and the fourth lens group while changing magnification, and
Dg34min: the minimum value of the distance between the third lens group and the fourth lens group while changing magnification.

Conditional formula (1) defines an appropriate difference between the maximum value and the minimum value of the distances between two lens groups which are floating groups, with respect to the focal length at the wide angle end. Satisfying conditional formula (1) can suppress increases in the height of the rays at the wide angle side and enables a wider angle of view to be achieved. Setting the value of (Dg34max−Dg34min)/fw to fall below the lower limit defined by conditional formula (1) will make the converging effect on light rays by the third lens group G3 insufficient. Thereby, widening the angle of view will be difficult.

It is more preferable for conditional formula (1-1) below to be satisfied to enhance the advantageous effects described above:

$$(Dg34max-Dg34min)/fw>3.0 \qquad (1-1).$$

Further, it is preferable for the zoom lens of the present embodiment to satisfy conditional formula (2) below.

$$(Dg34max-Dg34min)/f3>0.10 \qquad (2),$$ where f3: the focal length of the third lens group,
Dg34max: the maximum value of the distance between the third lens group and the fourth lens group while changing magnification, and
Dg34min: the minimum value of the distance between the third lens group and the fourth lens group while changing magnification.

Conditional formula (2) defines an appropriate difference between the maximum value and the minimum value of the distances between two lens groups which are floating groups, with respect to the focal length of the third lens group G3. Setting the value of (Dg34max−Dg34min)/f3 to fall below the lower limit defined by conditional formula (2) will make the converging effect on light rays by the third lens group G3 insufficient. Thereby, widening the angle of view will be difficult.

It is more preferable for conditional formula (2-1) below to be satisfied to enhance the advantageous effect described above.

$$(Dg34max-Dg34min)/f3>0.15 \qquad (2-1).$$

As described above, according to the zoom lens of the present embodiment, the zoom lens is of a five-group configuration as a whole and the configuration of each lens group is suitably set. Further, the zoom lens adopts a floating system in which the third lens group G3 and the fourth lens group G4 correct variations in the imaging plane due to changes in magnification with respect to the second lens group G2 which acts on changes in magnification particularly when changing magnification and the third lens group G3 and the fourth lens group G4 move relative to each other. Therefore, it becomes possible to favorably correct variations in the imaging plane while changing magnification and suppressing fluctuations in spherical aberration and comatic aberration while changing magnification. Further, image formation magnification rates β of the combined lens group formed by combining the third lens group G3 and the fourth lens group G4 together and the second lens group are configured to simultaneously pass a −1× point while changing magnification from the wide angle end to the telephoto end. This enables a compact zoom lens having a high magnification ratio with fluctuations in aberrations suppressed satisfactorily to be achieved. Satisfying conditional formula (1) can suppress increase in the height of the rays on the wide angle side and enables a high-magnification zoom lens with a wide angle of view and high performance to be realized.

EXAMPLES

Next, specific Numerical Examples of the zoom lens according to the present embodiment will be described.

Example 1

Figure 7:
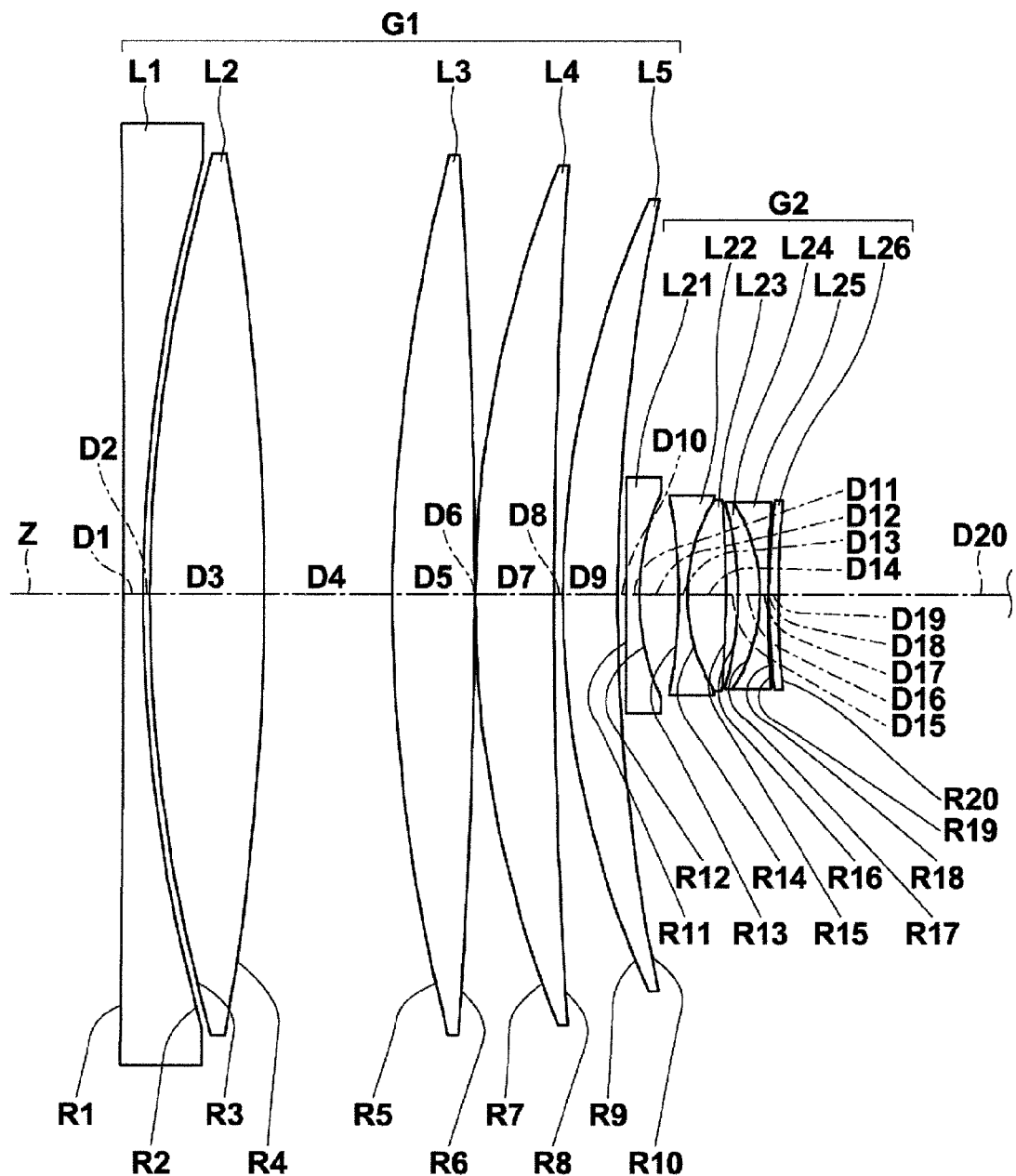
FIG. 7 is a cross-sectional view of the first lens group and the second lens group of the zoom lens according to Example 1 of the present invention, particularly illustrating a configuration thereof.
Figure 8:
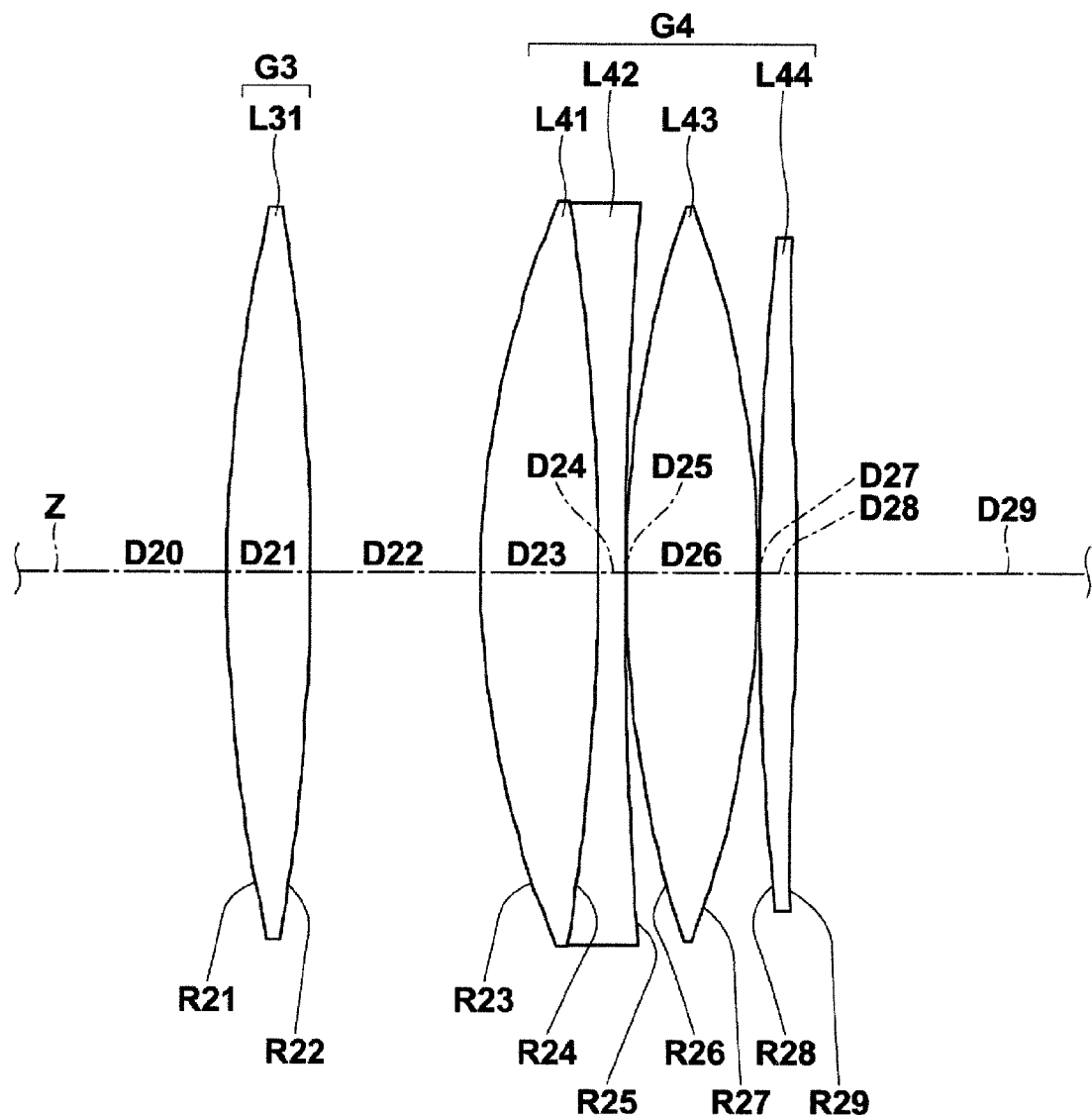
FIG. 8 is a cross-sectional view of the third lens group and the fourth lens group of the zoom lens according to Example 1 of the present invention, particularly illustrating a configuration thereof.
Figure 9:
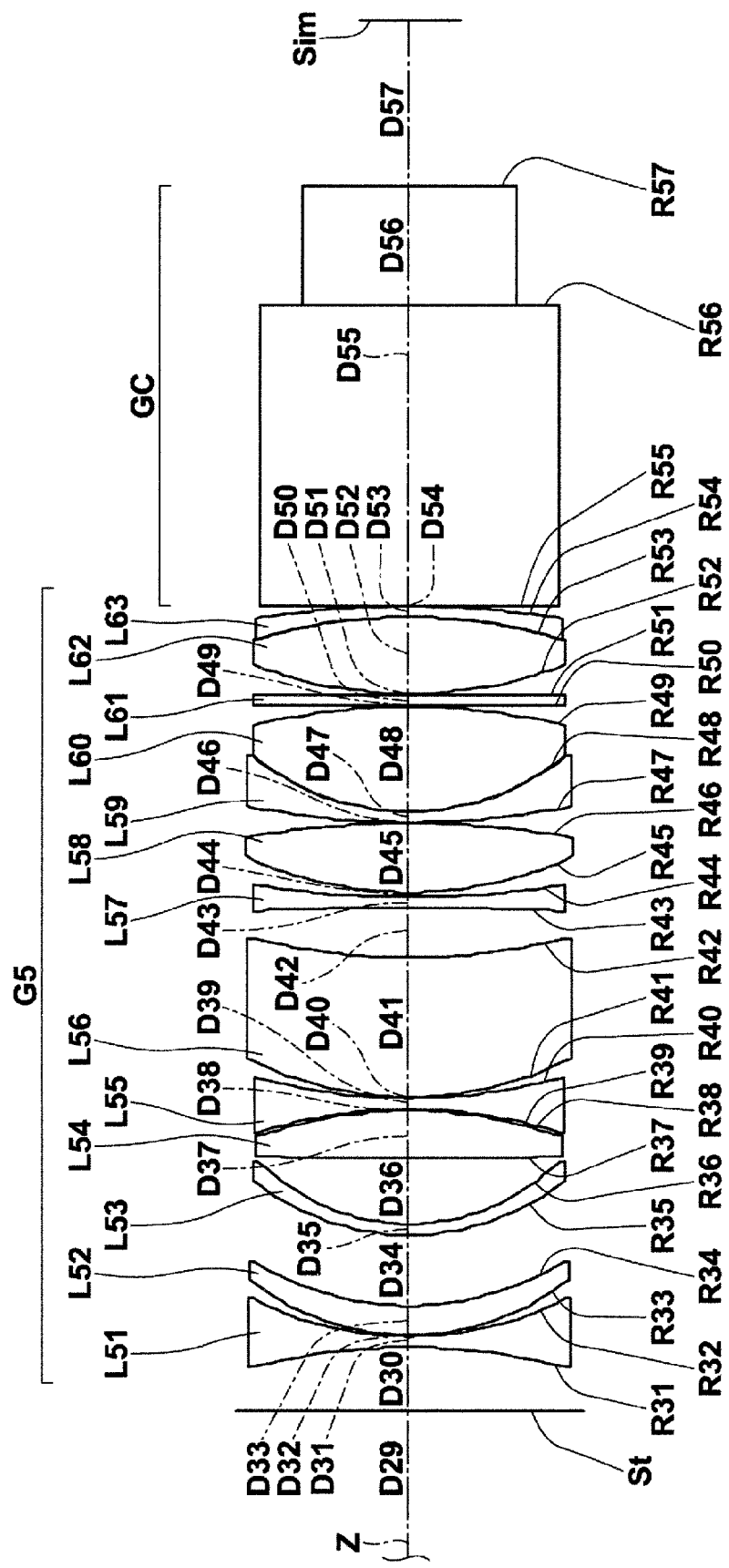
FIG. 9 is a cross-sectional view of the fifth lens group through the image formation surface of the zoom lens according to Example 1 of the present invention, particularly illustrating a configuration thereof.

The cross sectional view of the lens of Example 1 is shown in FIG. 1. Detailed configurations thereof are shown in FIGS. 7 through 9. FIG. 7 shows detailed configurations of the first lens group G1 and the second lens group G2, FIG. 8 shows detailed configurations of the third lens group G3 and the fourth lens group G4, and FIG. 9 shows detailed descriptions from the fifth lens group G5 to the image formation surface Sim.

In Example 1, the first lens group G1 is of a five-lens configuration including lenses L1 through L5, the second lens group G2 is of a six-lens configuration including lenses L21 through L26, the third lens group G3 is of a one-lens configuration including a lens L31, the fourth lens group G4 is of a four-lens configuration including lenses L41 through L44, and a fifth lens group G5 is of a thirteen-lens configuration including an aperture stop St and lenses L51 through L63.

Lens data of the zoom lens according to Example 1 is shown in Table 1, the other data is shown in Table 2, and aspherical surface coefficients are shown in Table 3. Note that the meanings of the symbols in Tables 1 through 3 to be described later are the same as those of Examples below. Further, values rounded to a predetermined digit are shown in the Tables below. In the data shown in the Tables below, degrees are used as the unit of angles and mm is used as the unit of length, but other appropriate units may also be used, as optical systems are usable even when they are proportionally enlarged or miniaturized.

In the lens data of Table 1, the i-th (i=1, 2, 3, . . . ) surface number, the value of i sequentially increasing from the surface of the constituent element at the most object side, which is designated as 1, toward the image side are shown in the column Si. The radii of curvature of the i-th surface are shown in the column Ri, and the distances between i-th surfaces and (i+1)st surfaces along the optical axis Z are shown in the column Di. Further, the refractive indices of j-th (j=1, 2, 3, . . . ) optical elements with respect to the d-line (wavelength: 587.6 nm), the value of j sequentially increasing from the optical element at the most object side, which is designated as 1, toward the image side, are shown in the column ndj. The Abbe numbers of j-th optical elements with respect to the d-line (wavelength: 587.6 nm) are shown in the column vdj. The partial dispersion ratios of j-th (j=1, 2, 3, . . . ) optical elements are shown in the column of θgfj. Note that the lens data also shows an aperture stop St and a color separation optical system GC. The sign of the radius of curvature is positive in the case that a surface shape is convex on the object side, and negative in the case that the surface shape is convex on the image side. Ri and Di of Table 1 correspond to the symbols Ri and Di of FIGS. 7 through 9.

In the lens data of Table 1, the columns of the distances between surfaces D10, D20, D22, and D29 respectively correspond to the distance between the first lens group G1 and the second lens group G2, the distance between the second lens group G2 and the third lens group G3, the distance between the third lens group G3 and the fourth lens group G4 which vary to change magnification. DD[10], DD[20], DD[22], and DD[29] indicated respectively in these columns indicate that these distances are variable. Note that "Dg34" in conditional formulas (1) and (2) corresponds to the distance between surfaces DD[22].

Table 2 shows values of a zoom ratio, a paraxial focal length f' (mm), a back focus (air converted length) Bf, an F-number (FNo.) and an angle of view (2ω) of the entire system at each of the wide angle end, the intermediate area, and the telephoto end in a state focused on infinity as other data. Further, Table 2 shows the distances between surfaces (mm) at the wide angle end, the intermediate area, and the telephoto end in a state focused on infinity as DD[10], DD[20], DD[22], and DD[29] of the distances between surfaces D10, D20, D22, and D29 which are data when changing magnification.

In lens data of Table 1, the mark "*" is indicated at the left of surface numbers for lens surfaces which are aspheric surfaces. In the basic lens data of Table 1, numerical values of paraxial radii of curvature are indicated as the radii of curvature of these aspheric surfaces.

Table 3 shows data regarding the aspheric surface of the imaging lens of Example 1. Surface numbers of aspheric surfaces and aspheric surface coefficients with respect to the aspheric surfaces are shown therein. Note that "E-n"(n: integer) in each of the numerical values of the aspheric surface coefficients means "×10$^{-n}$". The aspheric surface coefficients are the values of respective coefficients KA, Am in the aspheric surface formula below:

$$Zd = C \cdot h^2 / \{1 + (1 - KA \cdot C^2 \cdot h^2)^{1/2}\} + \Sigma Am \cdot h^m$$

where,
Zd: the depth of an aspheric surface (the length of a perpendicular line drawn from a point on an aspheric surface with a height h to a plane perpendicular to the optical axis which contacts the peak of the aspheric surface)
h: height (the distance from the optical axis to a lens surface)
C: an inverse number of a paraxial radius of curvature
KA, Am: aspherical surface coefficients The aspherical surface of the zoom lens according to Example 1 is expressed by effectively applying orders of A3 through A16 to an aspherical surface coefficient Am, based on the above aspherical surface formula.

TABLE 1

Example 1/Lens Data

| Si | Ri | Di | ndj | vdj | θ g,fj |
|---|---|---|---|---|---|
| 1 | −6658.4878 | 4.40 | 1.80610 | 40.92 | 0.57019 |
| 2 | 362.1042 | 1.50 | | | |
| 3 | 356.0559 | 25.98 | 1.43387 | 95.20 | 0.53733 |
| 4 | −556.3030 | 28.83 | | | |
| 5 | 390.8471 | 18.53 | 1.43387 | 95.20 | 0.53733 |
| 6 | −1375.8077 | 0.12 | | | |
| 7 | 258.6120 | 17.71 | 1.43387 | 95.20 | 0.53733 |
| 8 | 1492.5823 | 2.00 | | | |
| 9 | 211.4436 | 12.51 | 1.43875 | 94.93 | 0.53433 |
| 10 | 429.6666 | DD[10] | | | |
| *11 | 17223.3108 | 3.00 | 2.00100 | 29.13 | 0.59952 |
| 12 | 56.0298 | 8.86 | | | |
| 13 | −118.8746 | 2.00 | 1.81600 | 46.62 | 0.55682 |
| 14 | 41.6839 | 8.56 | 1.80809 | 22.76 | 0.63073 |
| 15 | −286.0359 | 2.81 | | | |
| 16 | −75.9789 | 4.87 | 1.80809 | 22.76 | 0.63073 |
| 17 | −39.7367 | 2.00 | 1.77250 | 49.60 | 0.55212 |
| 18 | 345.6090 | 0.12 | | | |
| 19 | 167.0642 | 2.00 | 1.50155 | 68.43 | 0.53171 |
| 20 | 201.7166 | DD[20] | | | |
| *21 | 174.1344 | 9.50 | 1.59522 | 67.74 | 0.54426 |
| 22 | −272.4560 | DD[22] | | | |
| 23 | 105.7031 | 13.47 | 1.43875 | 94.93 | 0.53433 |
| 24 | −261.2986 | 3.00 | 1.84666 | 23.78 | 0.62054 |
| 25 | 535.0155 | 0.12 | | | |
| 26 | 134.9016 | 15.02 | 1.43387 | 95.20 | 0.53733 |
| 27 | −121.8228 | 0.12 | | | |
| 28 | 373.8429 | 4.30 | 1.43875 | 94.93 | 0.53433 |
| *29 | −348.5653 | DD[29] | | | |
| 30(Stop) | ∞ | 6.94 | | | |
| 31 | −68.0334 | 1.20 | 1.53172 | 48.84 | 0.56309 |
| 32 | 37.4922 | 0.12 | | | |
| 33 | 27.8976 | 3.27 | 1.80518 | 25.42 | 0.61616 |
| 34 | 32.6349 | 7.75 | | | |
| 35 | 27.2839 | 1.20 | 1.61809 | 60.54 | 0.54205 |
| 36 | 23.0314 | 7.22 | | | |
| 37 | 656.1219 | 5.23 | 1.80518 | 25.42 | 0.61616 |
| 38 | −49.9872 | 0.12 | | | |
| 39 | −55.6831 | 1.25 | 1.80400 | 46.57 | 0.55724 |
| 40 | 64.6932 | 0.12 | | | |
| 41 | 38.4849 | 15.30 | 1.85533 | 32.74 | 0.59146 |
| 42 | 66.4774 | 5.45 | | | |
| 43 | −470.1445 | 1.20 | 1.88681 | 33.58 | 0.58803 |
| 44 | 113.0082 | 0.50 | | | |
| 45 | 42.7815 | 7.59 | 1.47964 | 82.12 | 0.51147 |
| 46 | −106.0172 | 0.12 | | | |
| 47 | 89.7402 | 1.20 | 1.88300 | 40.76 | 0.56679 |
| 48 | 27.3135 | 11.46 | 1.49700 | 81.54 | 0.53748 |
| 49 | −71.4908 | 0.22 | | | |
| 50 | ∞ | 1.00 | 1.51633 | 64.14 | 0.53531 |
| 51 | ∞ | 0.20 | | | |
| 52 | 47.5524 | 8.41 | 1.48749 | 70.23 | 0.53007 |
| 53 | −57.7686 | 1.20 | 1.83481 | 42.71 | 0.56431 |
| 54 | −101.6590 | 0.00 | | | |
| 55 | ∞ | 33.00 | 1.60863 | 46.60 | 0.56787 |
| 56 | ∞ | 13.20 | 1.51633 | 64.14 | 0.53531 |
| 57 | ∞ | 18.17 | | | |

TABLE 2

Example 1/Other Data

| | Wide Angle | Intermediate | Telephoto |
|---|---|---|---|
| Zoom Ratio | 1.0 | 3.6 | 110.0 |
| f | 8.55 | 20.09 | 940.19 |
| Bf | 47.39 | 47.39 | 47.39 |
| FNo. | 1.76 | 1.76 | 5.02 |
| 2 ω [°] | 70.0 | 29.6 | 0.6 |
| DD[10] | 1.87 | 75.90 | 211.23 |
| DD[20] | 298.66 | 194.76 | 4.52 |
| DD[22] | 19.49 | 39.54 | 2.60 |
| DD[29] | 3.05 | 12.87 | 104.72 |

TABLE 2-continued

Example 1/Other Data

|  | Wide Angle | Intermediate | Telephoto |
|---|---|---|---|

TABLE 3

Example 1/Aspherical Surface Coefficient

| Surface Number | 11 | 21 | 29 |
|---|---|---|---|
| KA | −1.0560673E+07 | −2.5646895E+00 | −1.2102030E+02 |
| A3 | −6.5099602E−07 | −2.4140992E−07 | 9.1703639E−07 |
| A4 | 8.9671558E−07 | −2.3544528E−08 | −1.2356506E−08 |
| A5 | −5.5248435E−08 | 5.8498064E−09 | 5.7433545E−08 |
| A6 | −1.4133071E−09 | −7.1343769E−10 | −5.5744053E−09 |
| A7 | 5.4439812E−10 | 3.6959234E−11 | 3.3706862E−10 |
| A8 | −3.1254541E−11 | −6.3445247E−13 | −1.0113154E−11 |
| A9 | 4.3046715E−13 | −2.8840871E−15 | 5.7897335E−14 |
| A10 | 2.6343602E−15 | −5.1813755E−16 | 4.4708227E−15 |
| A11 | 9.0135622E−16 | 3.1801800E−17 | −1.1548774E−16 |
| A12 | −4.6125007E−17 | 2.1482522E−20 | 2.8521722E−18 |
| A13 | 7.1632537E−19 | −2.1216030E−20 | −1.3847062E−19 |
| A14 | −2.5129412E−20 | 1.2922165E−22 | 3.7281660E−21 |
| A15 | 1.1132105E−21 | 6.7146617E−24 | −4.3743445E−23 |
| A16 | −1.4831401E−23 | −8.1823600E−26 | 1.7703554E−25 |

Example 2

Figure 10:
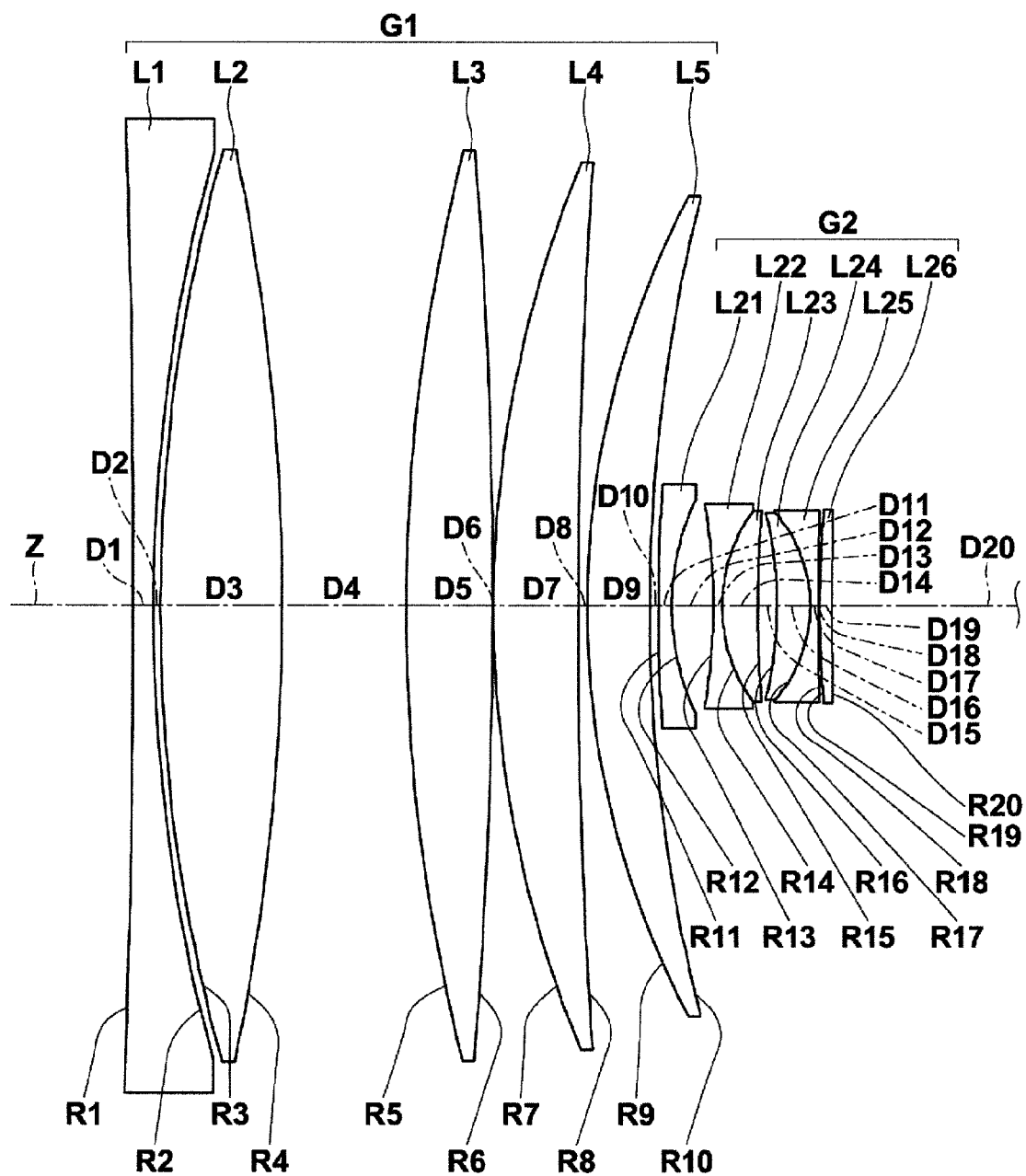
FIG. 10 is a cross-sectional view of the first lens group and the second lens group of the zoom lens according to Example 2 of the present invention, particularly illustrating a configuration thereof.
Figure 11:
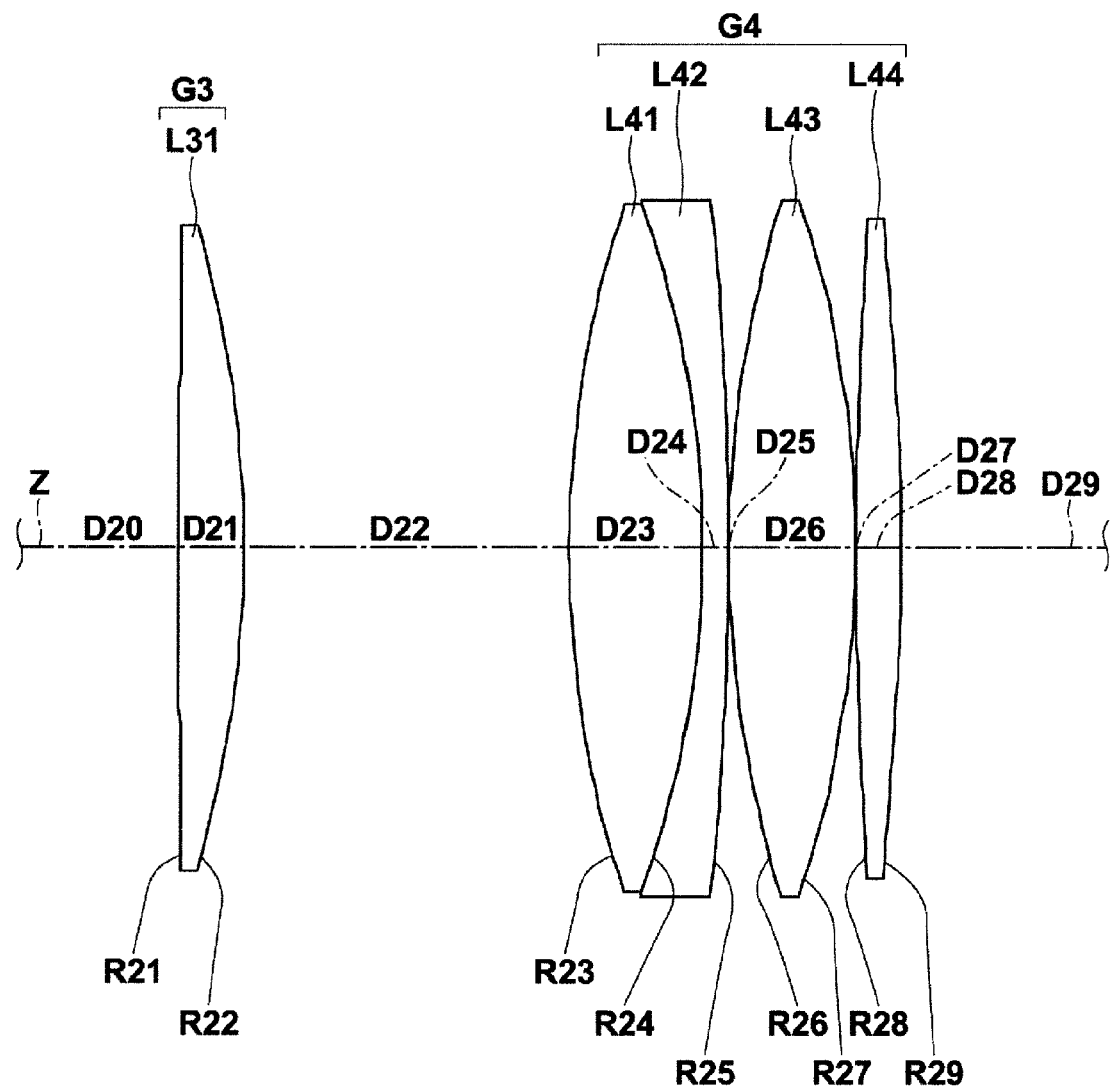
FIG. 11 is a cross-sectional view of the third lens group and the fourth lens group of the zoom lens according to Example 2 of the present invention, particularly illustrating a configuration thereof.
Figure 12:
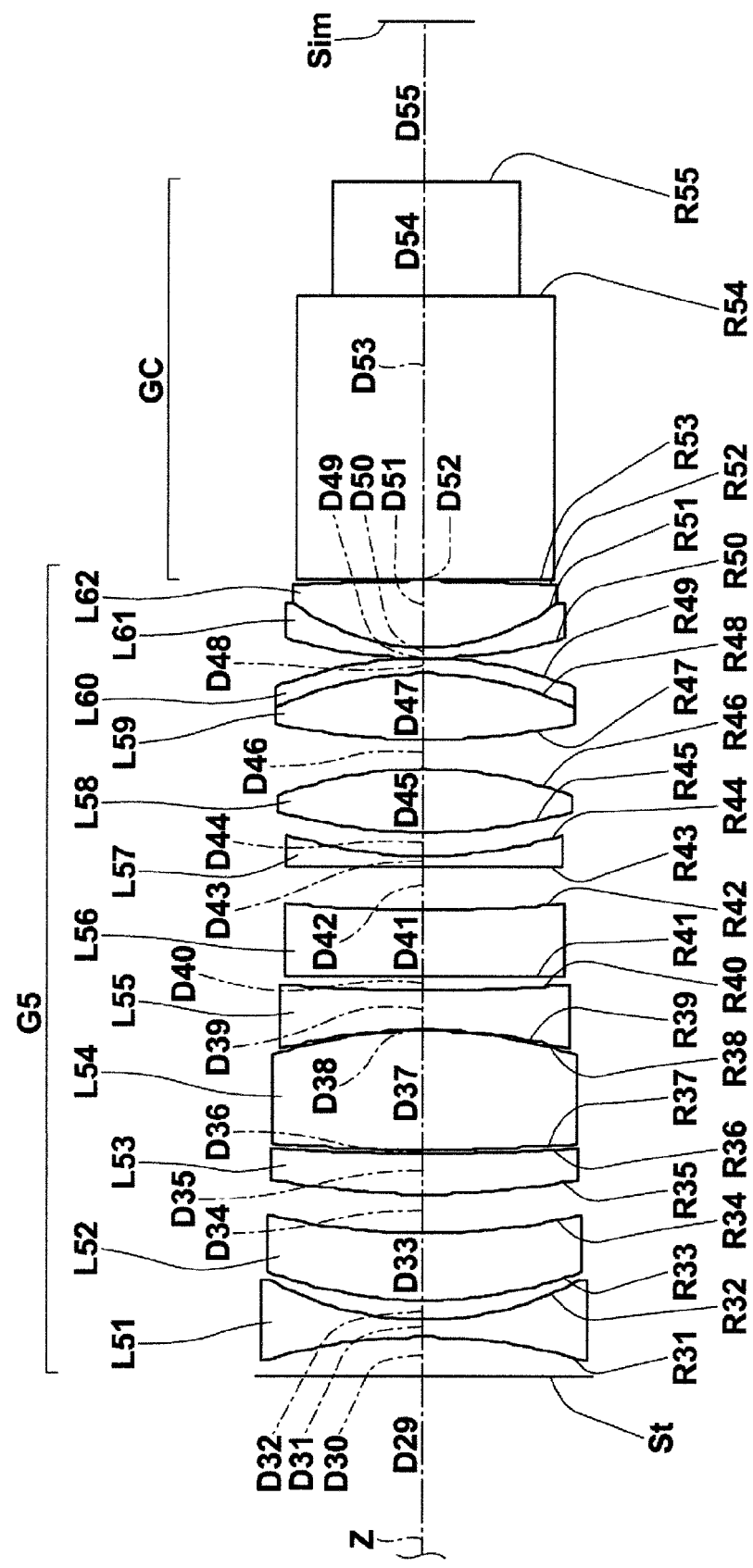
FIG. 12 is a cross-sectional view of the fifth lens group through the image formation surface of the zoom lens according to Example 2 of the present invention, particularly illustrating a configuration thereof.

The cross sectional view of lenses in Example 2 is shown in FIG. 2, and detailed configurations thereof are shown in FIGS. 10 through 12. FIG. 10 shows the detailed configuration of the first lens group G1 and the second lens group G2, FIG. 11 shows the detailed configurations of the third lens group G3 and the fourth lens group G4, and FIG. 12 shows the detailed configuration from the fifth lens group G5 to the image formation surface Sim.

In Example 2, the first lens group G1 is of a five-lens configuration including lenses L1 through L5, the second lens group G2 is of a six-configuration including lenses L21 through L26, the third lens group G3 is of a one-lens configuration including L31, the fourth lens group G4 is of a four-lens configuration including lenses L41 through L44, and the fifth lens group G5 is of a twelve-lens configuration including an aperture stop St and lenses L51 through L62.

Lens data of the zoom lens according to Example 2 is shown in Table 4, the other data is shown in Table 5, and the aspherical surface coefficients are shown in Table 6.

TABLE 4

Example 2/Lens Data

| Si | Ri | Di | ndj | ν dj | θ g,fj |
|---|---|---|---|---|---|
| 1 | −2882.5532 | 4.40 | 1.80610 | 40.92 | 0.57019 |
| 2 | 381.1759 | 1.50 | | | |
| 3 | 371.2247 | 26.47 | 1.43387 | 95.20 | 0.53733 |
| 4 | −481.9294 | 27.18 | | | |
| 5 | 405.0638 | 18.83 | 1.43387 | 95.20 | 0.53733 |
| 6 | −1195.2648 | 0.12 | | | |
| 7 | 252.6840 | 18.49 | 1.43387 | 95.20 | 0.53733 |
| 8 | 1481.4139 | 2.00 | | | |
| 9 | 191.4823 | 13.60 | 1.43875 | 94.93 | 0.53433 |
| 10 | 364.4369 | DD[10] | | | |
| 11 | 338.5174 | 3.00 | 2.00100 | 29.13 | 0.59952 |
| 12 | 53.6886 | 9.11 | | | |
| 13 | −133.6878 | 2.00 | 1.88300 | 40.76 | 0.56679 |
| 14 | 35.4045 | 7.83 | 1.80809 | 22.76 | 0.63073 |
| 15 | 248.1104 | 4.15 | | | |

TABLE 4-continued

Example 2/Lens Data

| Si | Ri | Di | ndj | ν dj | θ g,fj |
|---|---|---|---|---|---|
| 16 | −87.9647 | 7.18 | 1.80809 | 22.76 | 0.63073 |
| 17 | −31.1691 | 1.84 | 1.85426 | 42.57 | 0.56254 |
| 18 | 884.3932 | 0.28 | | | |
| *19 | 268.7159 | 2.69 | 1.80518 | 25.42 | 0.61616 |
| 20 | 2604.6731 | DD[20] | | | |
| *21 | 2237.6953 | 7.53 | 1.59522 | 67.74 | 0.54426 |
| 22 | −130.3946 | DD[22] | | | |
| 23 | 127.2034 | 15.56 | 1.43875 | 94.93 | 0.53433 |
| 24 | −112.6593 | 3.00 | 1.80518 | 25.42 | 0.61616 |
| 25 | −385.5994 | 0.10 | | | |
| 26 | 137.1886 | 14.59 | 1.43387 | 95.20 | 0.53733 |
| 27 | −127.6513 | 0.10 | | | |
| 28 | 568.5339 | 5.27 | 1.43875 | 94.93 | 0.53433 |
| *29 | −235.2707 | DD[29] | | | |
| 30(Stop) | ∞ | 4.63 | | | |
| 31 | −63.3468 | 2.00 | 1.51633 | 64.14 | 0.53531 |
| 32 | 37.5379 | 2.20 | | | |
| 33 | 50.1424 | 7.81 | 1.80518 | 25.42 | 0.61616 |
| 34 | 79.0003 | 4.56 | | | |
| 35 | 97.9634 | 4.62 | 1.58766 | 66.51 | 0.53397 |
| 36 | 228.0141 | 0.55 | | | |
| 37 | 243.6454 | 13.73 | 1.90133 | 24.80 | 0.61589 |
| 38 | −56.0453 | 0.12 | | | |
| 39 | −63.3992 | 4.54 | 1.92694 | 35.31 | 0.58071 |
| 40 | 221.6286 | 1.67 | | | |
| 41 | −1894.5199 | 7.63 | 1.86246 | 40.44 | 0.56825 |
| 42 | 193.1185 | 5.06 | | | |
| 43 | 137980.0407 | 1.20 | 1.92600 | 35.40 | 0.58044 |
| 44 | 54.2093 | 2.75 | | | |
| 45 | 63.4372 | 7.20 | 1.47074 | 63.10 | 0.53628 |
| 46 | −51.7192 | 3.42 | | | |
| 47 | 80.2870 | 7.69 | 1.49700 | 81.54 | 0.53748 |
| 48 | −40.4076 | 1.72 | 1.83481 | 42.73 | 0.56486 |
| 49 | −47.4060 | 0.12 | | | |
| 50 | 59.1704 | 1.20 | 1.88300 | 40.76 | 0.56679 |
| 51 | 25.5406 | 7.68 | 1.46647 | 67.59 | 0.52970 |
| 52 | −240.6129 | 0.00 | | | |
| 53 | ∞ | 33.00 | 1.60863 | 46.60 | 0.56787 |
| 54 | ∞ | 13.20 | 1.51633 | 64.14 | 0.53531 |
| 55 | ∞ | 18.63 | | | |

TABLE 5

Example 2/Other Data

|  | Wide Angle | Intermediate | Telephoto |
|---|---|---|---|
| Zoom Ratio | 1.0 | 3.6 | 110.0 |
| f | 8.57 | 20.13 | 942.15 |
| Bf | 47.85 | 47.85 | 47.85 |
| FNo. | 1.76 | 1.76 | 4.97 |
| 2 ω [°] | 69.0 | 29.4 | 0.6 |
| DD[10] | 1.75 | 66.14 | 202.59 |
| DD[20] | 270.99 | 158.22 | 3.93 |
| DD[22] | 37.80 | 72.45 | 1.46 |
| DD[29] | 1.70 | 15.43 | 104.27 |

TABLE 6

Example 2/Aspherical Surface Coefficient

| Surface Number | 19 | 21 | 29 |
|---|---|---|---|
| KA | 9.6256750E−01 | 4.4555256E+00 | −6.7189484E+00 |
| A3 | 4.7874714E−07 | −9.4296108E−07 | 6.4891351E−07 |
| A4 | −2.1717313E−07 | 1.0852951E−07 | −1.0300575E−08 |
| A5 | 7.9128387E−08 | −9.9003499E−09 | 8.3889243E−08 |
| A6 | −1.1603798E−08 | −3.2279132E−11 | −8.9270179E−09 |
| A7 | 1.1960309E−09 | 4.1682651E−11 | 5.6004986E−10 |
| A8 | −1.1263495E−10 | −1.7932094E−12 | −1.8965248E−11 |
| A9 | 9.6028727E−12 | 2.8696284E−15 | 2.2201939E−13 |

TABLE 6-continued

Example 2/Aspherical Surface Coefficient

| Surface Number | 19 | 21 | 29 |
|---|---|---|---|
| A10 | −4.4629994E−13 | 1.0574058E−15 | 1.3708120E−15 |
| A11 | −3.0563472E−15 | −1.0095930E−18 | 3.7993244E−16 |
| A12 | 1.1632920E−15 | −4.3686656E−19 | −3.2919620E−17 |
| A13 | −3.5265160E−17 | −6.1245204E−21 | 1.1277010E−18 |
| A14 | 3.7349174E−20 | 1.3075634E−22 | −2.1182469E−20 |
| A15 | 4.6831771E−21 | 6.1205335E−24 | 2.2216553E−22 |
| A16 | 1.2465624E−22 | −1.0001129E−25 | −1.0417475E−24 |

Example 3

Figure 13:
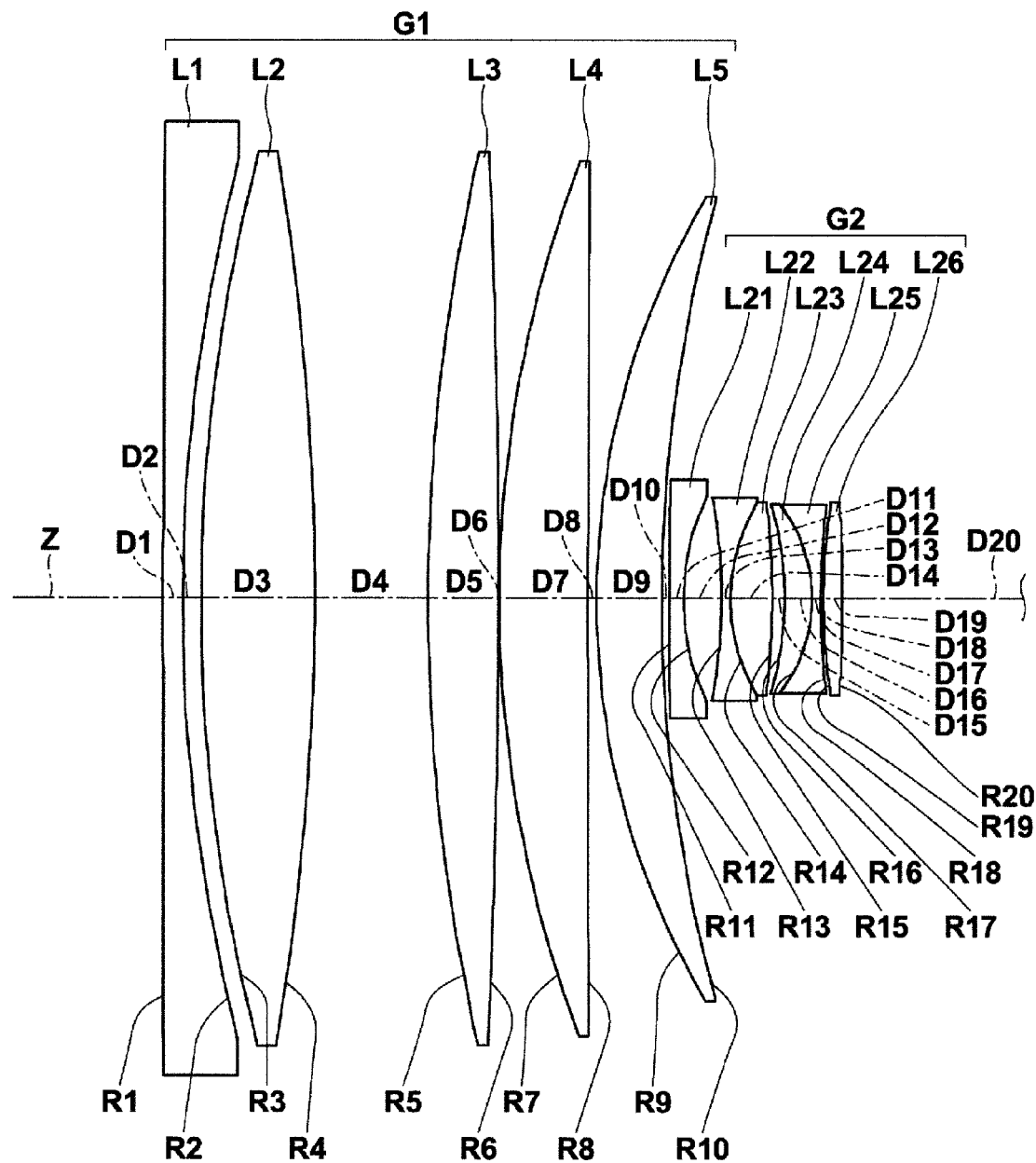
FIG. 13 is a cross-sectional view of the first lens group and the second lens group of the zoom lens according to Example 3 of the present invention, particularly illustrating a configuration thereof.
Figure 14:
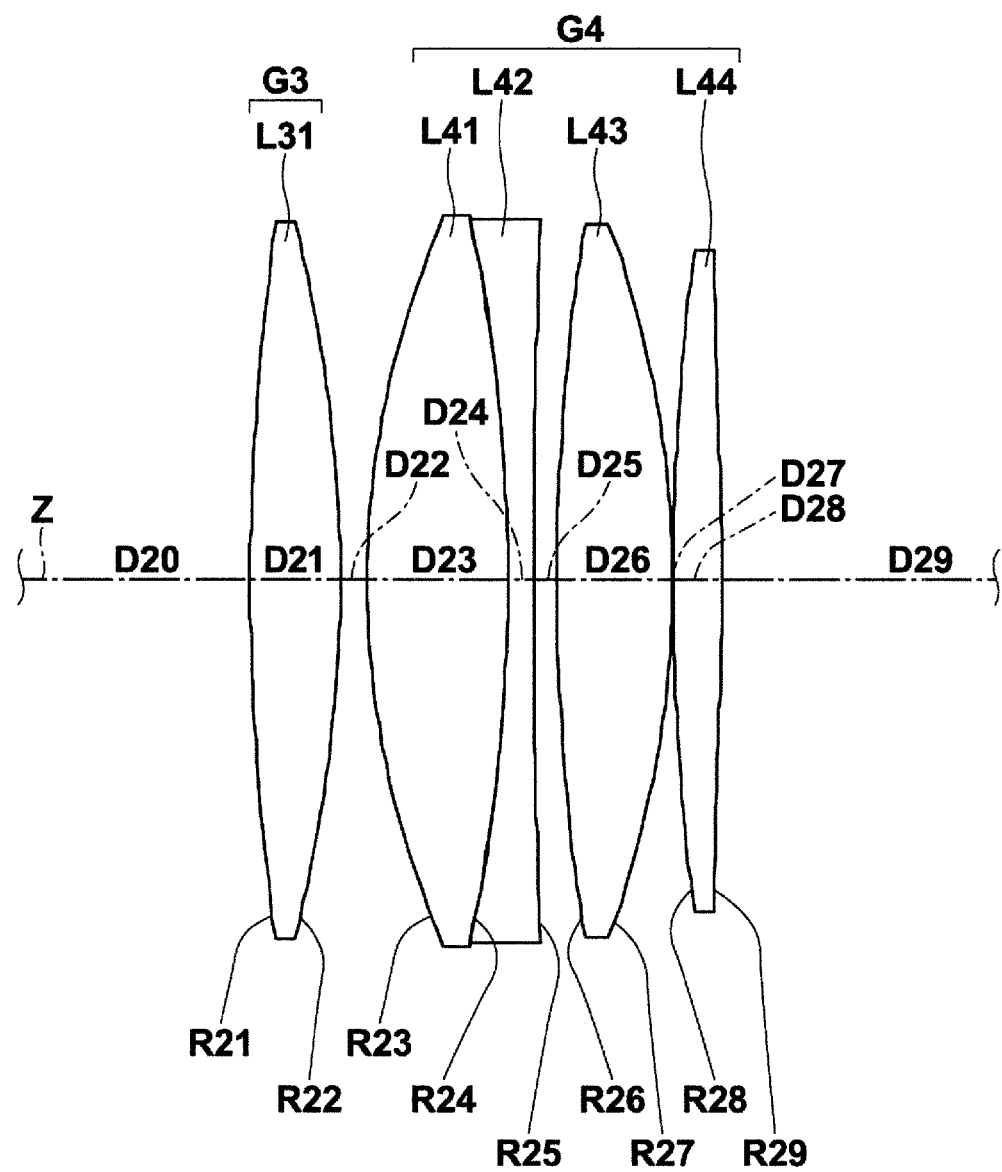
FIG. 14 is a cross-sectional view of the third lens group and the fourth lens group of the zoom lens according to Example 3 of the present invention, particularly illustrating a configuration thereof.
Figure 15:
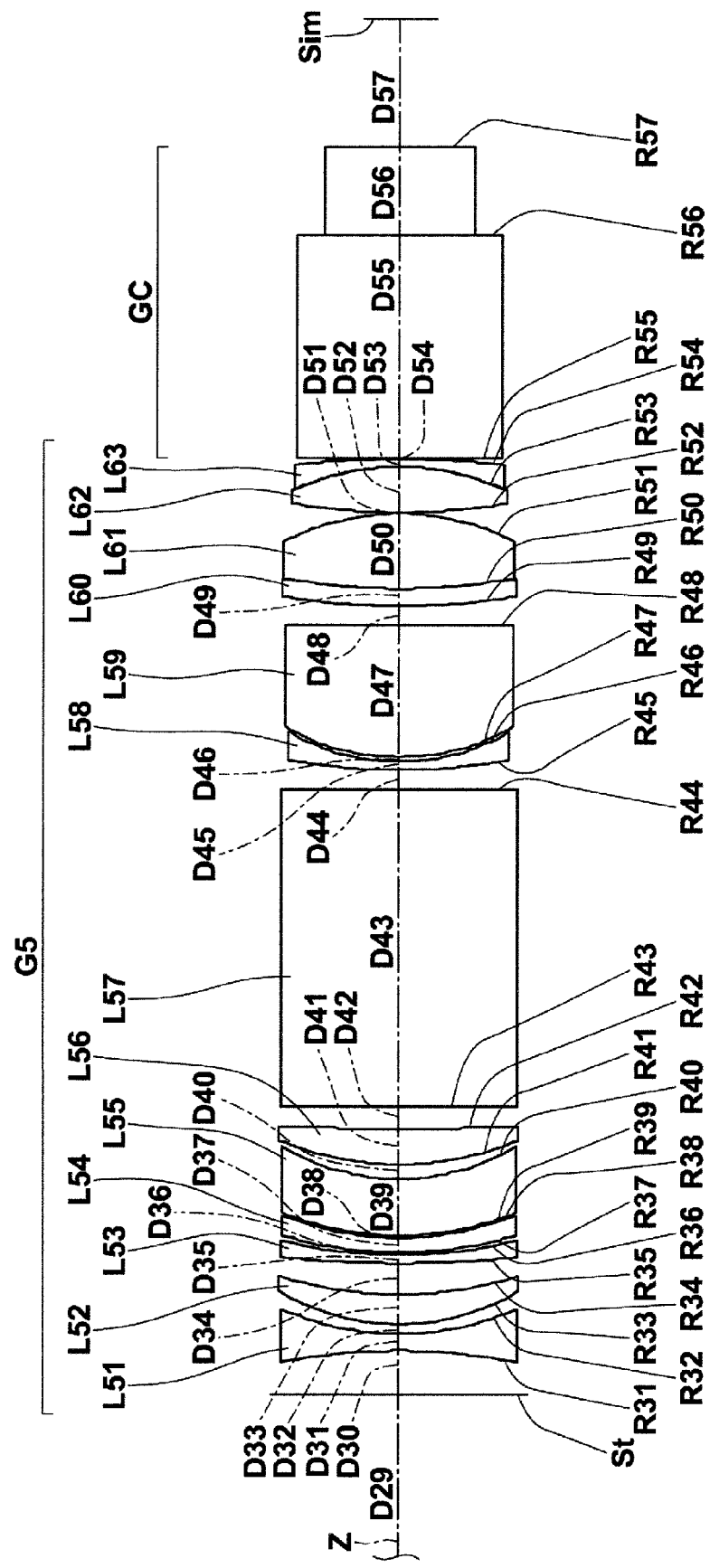
FIG. 15 is a cross-sectional view of the fifth lens group through the image formation surface of the zoom lens according to Example 3 of the present invention, particularly illustrating a configuration thereof.

The cross sectional view of lenses in Example 3 is shown in FIG. 3, and detailed configurations thereof are shown in FIGS. 13 through 15. FIG. 13 shows the detailed configuration of the first lens group G1 and the second lens group G2, FIG. 14 shows the detailed configurations of the third lens group G3 and the fourth lens group G4, and FIG. 15 shows the detailed configuration from the fifth lens group G5 to the image formation surface Sim.

In Example 3, the first lens group G1 is of a five-lens configuration including lenses L1 through L5, the second lens group G2 is of a six-lens configuration including lenses L21 through L26, the third lens group G3 is of a one-lens configuration including a lens L31, the fourth lens group G4 is of a four-lens configuration including lenses L41 through L44, and the fifth lens group G5 is of a thirteen-lens configuration including an aperture stop St and lenses L51 through L63.

Lens data of the zoom lens according to Example 3 is shown in Table 7, the other data is shown in Table 8, and the aspherical surface coefficients are shown in Table 9.

TABLE 7

Example 3/Lens Data

| Si | Ri | Di | ndj | νdj | θg,fj |
|---|---|---|---|---|---|
| 1 | 23748.0487 | 4.40 | 1.83400 | 37.16 | 0.57759 |
| 2 | 391.2863 | 4.05 | | | |
| 3 | 390.2945 | 25.37 | 1.43387 | 95.20 | 0.53733 |
| 4 | −582.9619 | 25.21 | | | |
| 5 | 440.0826 | 15.84 | 1.43387 | 95.20 | 0.53733 |
| 6 | −2069.3724 | 0.12 | | | |
| 7 | 275.7598 | 19.55 | 1.43387 | 95.20 | 0.53733 |
| 8 | 13879.8234 | 2.00 | | | |
| 9 | 175.7640 | 14.54 | 1.43875 | 94.93 | 0.53433 |
| 10 | 333.6143 | DD[10] | | | |
| *11 | −16789.6372 | 3.00 | 2.00100 | 29.13 | 0.59952 |
| 12 | 52.1516 | 8.42 | | | |
| 13 | −118.9342 | 2.00 | 1.81600 | 46.62 | 0.55682 |
| 14 | 41.5348 | 9.27 | 1.80809 | 22.76 | 0.63073 |
| 15 | −174.9293 | 2.73 | | | |
| 16 | −73.4453 | 6.16 | 1.80809 | 22.76 | 0.63073 |
| 17 | −33.9120 | 2.00 | 1.83763 | 43.08 | 0.56243 |
| 18 | 176.8239 | 0.57 | | | |
| 19 | 130.8223 | 4.23 | 1.48749 | 70.23 | 0.53007 |
| 20 | −426.5091 | DD[20] | | | |
| *21 | 269.6225 | 10.65 | 1.59198 | 63.69 | 0.53831 |
| 22 | −169.1454 | DD[22] | | | |
| 23 | 106.3269 | 16.61 | 1.43875 | 94.93 | 0.53433 |
| 24 | −200.6201 | 3.00 | 1.84666 | 23.78 | 0.62054 |
| 25 | 1153.5198 | 2.73 | | | |
| 26 | 271.5561 | 13.53 | 1.43387 | 95.20 | 0.53733 |
| 27 | −120.2776 | 0.06 | | | |
| 28 | 289.5996 | 5.78 | 1.43875 | 94.93 | 0.53433 |
| *29 | −406.9004 | DD[29] | | | |
| 30(Stop) | ∞ | 6.52 | | | |
| 31 | −95.2378 | 2.53 | 1.79738 | 47.51 | 0.55388 |
| 32 | 43.0321 | 1.45 | | | |

TABLE 7-continued

Example 3/Lens Data

| Si | Ri | Di | ndj | νdj | θg,fj |
|---|---|---|---|---|---|
| 33 | 35.0863 | 4.38 | 1.84666 | 23.88 | 0.62182 |
| 34 | 58.7013 | 4.65 | | | |
| 35 | 178.5166 | 1.20 | 1.84270 | 33.84 | 0.58855 |
| 36 | 71.4508 | 0.39 | | | |
| 37 | 59.8331 | 2.21 | 1.83404 | 26.43 | 0.60970 |
| 38 | 46.6298 | 0.34 | | | |
| 39 | 46.3935 | 8.36 | 1.45206 | 64.95 | 0.53120 |
| 40 | 33.0549 | 2.24 | | | |
| 41 | 46.7775 | 5.37 | 1.87888 | 28.45 | 0.60415 |
| 42 | 1054.7137 | 3.19 | | | |
| 43 | ∞ | 47.00 | 1.70154 | 41.24 | 0.57664 |
| 44 | ∞ | 3.00 | | | |
| 45 | 102.7025 | 1.20 | 1.91388 | 36.47 | 0.57749 |
| 46 | 32.8205 | 0.68 | | | |
| 47 | 34.7166 | 19.50 | 1.48749 | 70.23 | 0.53007 |
| 48 | −1306.7277 | 2.87 | | | |
| 49 | 108.1859 | 2.54 | 1.88240 | 38.67 | 0.57231 |
| 50 | 96.2512 | 11.17 | 1.49700 | 81.54 | 0.53748 |
| 51 | −37.4994 | 0.16 | | | |
| 52 | 100.2349 | 6.71 | 1.48749 | 70.23 | 0.53007 |
| 53 | −38.3185 | 1.20 | 1.83424 | 43.99 | 0.56014 |
| 54 | −151.0537 | 0.20 | | | |
| 55 | ∞ | 33.00 | 1.60863 | 46.60 | 0.56787 |
| 56 | ∞ | 13.20 | 1.51633 | 64.14 | 0.53531 |
| 57 | ∞ | 19.03 | | | |

TABLE 8

Example 3/Other Data

| | Wide Angle | Intermediate | Telephoto |
|---|---|---|---|
| Zoom Ratio | 1.0 | 3.5 | 103.0 |
| f | 8.52 | 19.78 | 877.32 |
| Bf | 48.45 | 48.45 | 48.45 |
| FNo. | 1.76 | 1.76 | 4.59 |
| 2ω [°] | 69.6 | 30.0 | 0.8 |
| DD[10] | 1.83 | 68.39 | 197.28 |
| DD[20] | 299.70 | 198.05 | 2.06 |
| DD[22] | 3.16 | 28.68 | 1.04 |
| DD[29] | 3.02 | 12.61 | 107.34 |

TABLE 9

Example 3/Aspherical Surface Coefficient

| Surface Number | 11 | 21 | 29 |
|---|---|---|---|
| KA | −2.8085771E+07 | −2.9662887E+00 | −2.3581504E+02 |
| A3 | −1.3375542E−06 | −1.3193425E−06 | −1.5899746E−06 |
| A4 | −1.2777185E−07 | −8.0284404E−08 | −2.8400273E−07 |
| A5 | 8.3387849E−08 | 1.7166267E−08 | 7.6188282E−08 |
| A6 | −5.8228695E−09 | −1.1586681E−09 | −6.4041905E−09 |
| A7 | 3.8723993E−10 | 1.5739909E−11 | 3.0694404E−10 |
| A8 | −4.9876871E−11 | 1.3013656E−12 | −8.4592142E−12 |
| A9 | 3.5365431E−12 | −6.9180995E−14 | 1.4978477E−13 |
| A10 | −3.6996363E−14 | 2.0739819E−15 | −2.0621754E−15 |
| A11 | −6.0224988E−15 | −5.8848365E−17 | 1.2772896E−17 |
| A12 | 1.1373820E−16 | 5.6046411E−19 | 1.0050880E−18 |
| A13 | 1.1235964E−17 | 4.0134982E−20 | −7.1943407E−20 |
| A14 | −5.1439336E−19 | −1.5399791E−21 | 2.6096353E−21 |
| A15 | 6.9310481E−21 | 2.0818993E−23 | −4.7404073E−23 |
| A16 | −1.6847737E−23 | −9.9835662E−26 | 3.3165061E−25 |

[Each Example and Other Data of Numerical Values]

Table 10 shows values corresponding to conditional formulas (1) and (2) according to Examples 1 through 3. As can be understood from Table 10, all of the Examples 1 through 3 satisfy conditional formulas (1) and (2).

TABLE 10

| Expression Number | Conditional Formula | Example 1 | Example 2 | Example 3 |
|---|---|---|---|---|
| (1) | (D34max-D34min)/fw | 4.32 | 8.29 | 3.24 |
| (2) | (D34max-D34min)/f3 | 0.21 | 0.34 | 0.16 |

[Aberration Performance]

Figure 16:
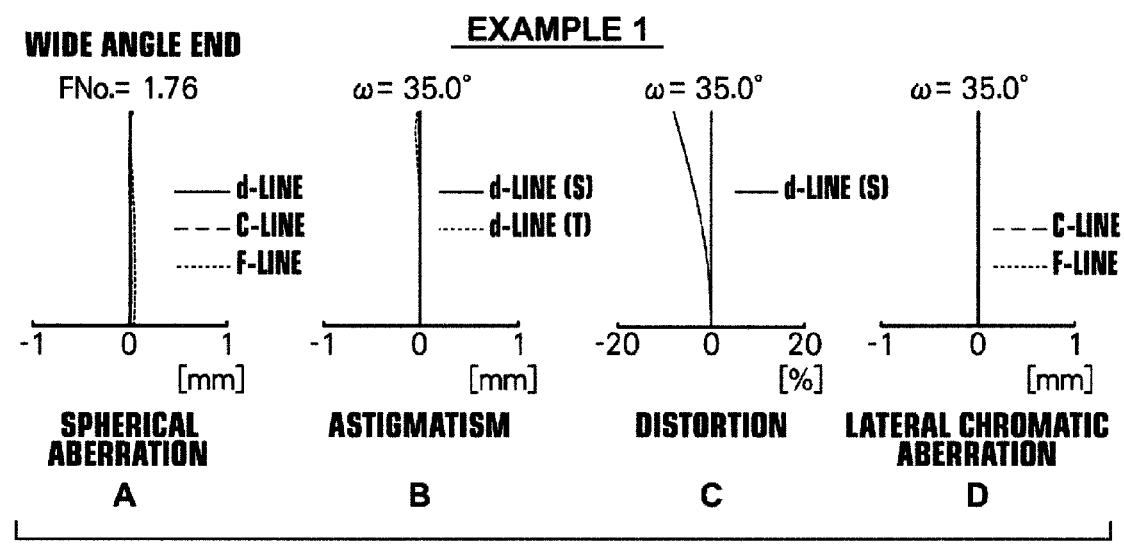
FIG. 16 shows various aberration diagrams of the zoom lens according to Example 1 of the present invention (wide angle end).
Figure 17:
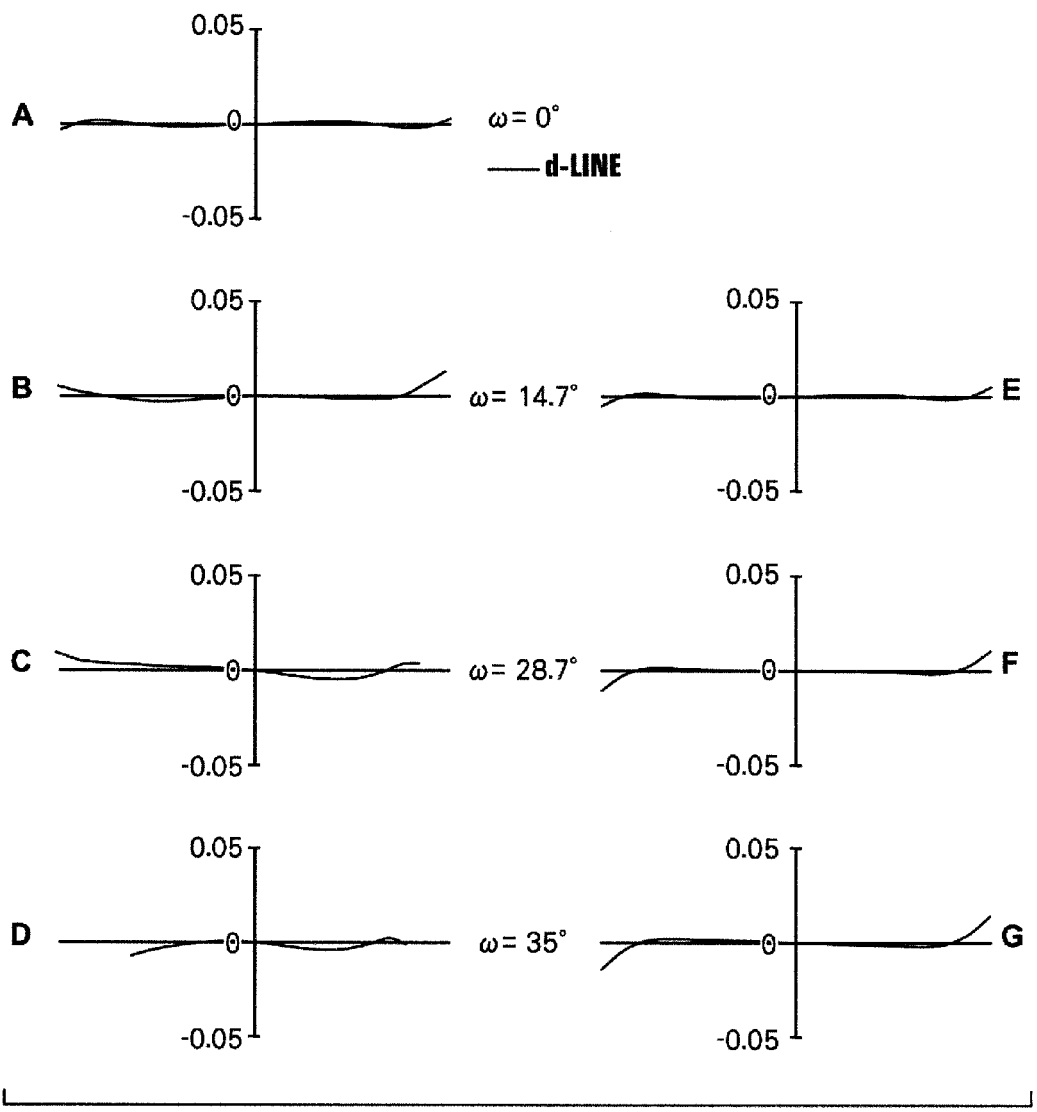
FIG. 17 shows coma aberration diagrams of the zoom lens according to Example 1 of the present invention (wide angle end).
Figure 18:
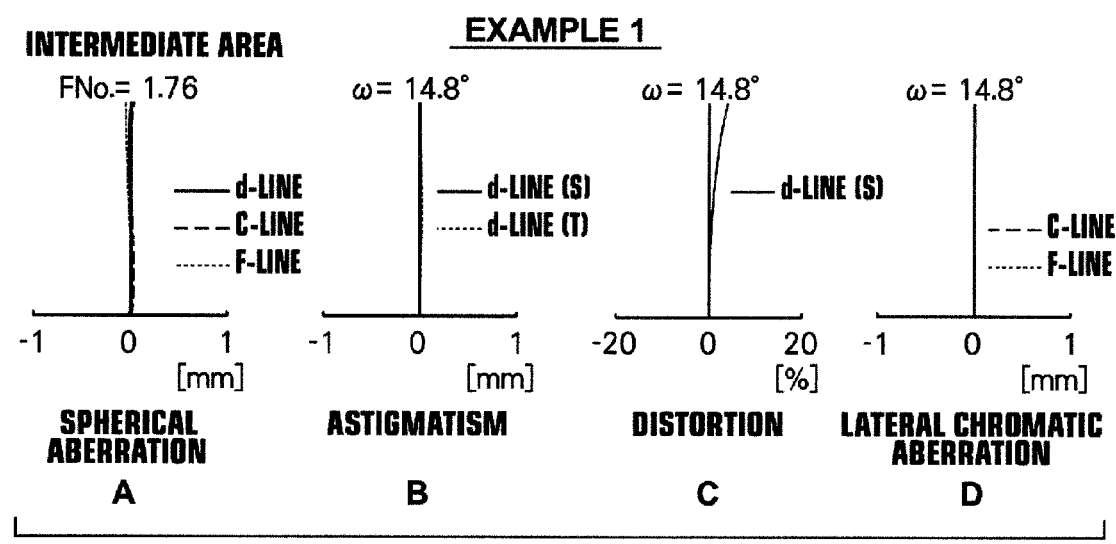
FIG. 18 shows various aberration diagrams of the zoom lens according to Example 1 of the present invention (intermediate area).
Figure 19:
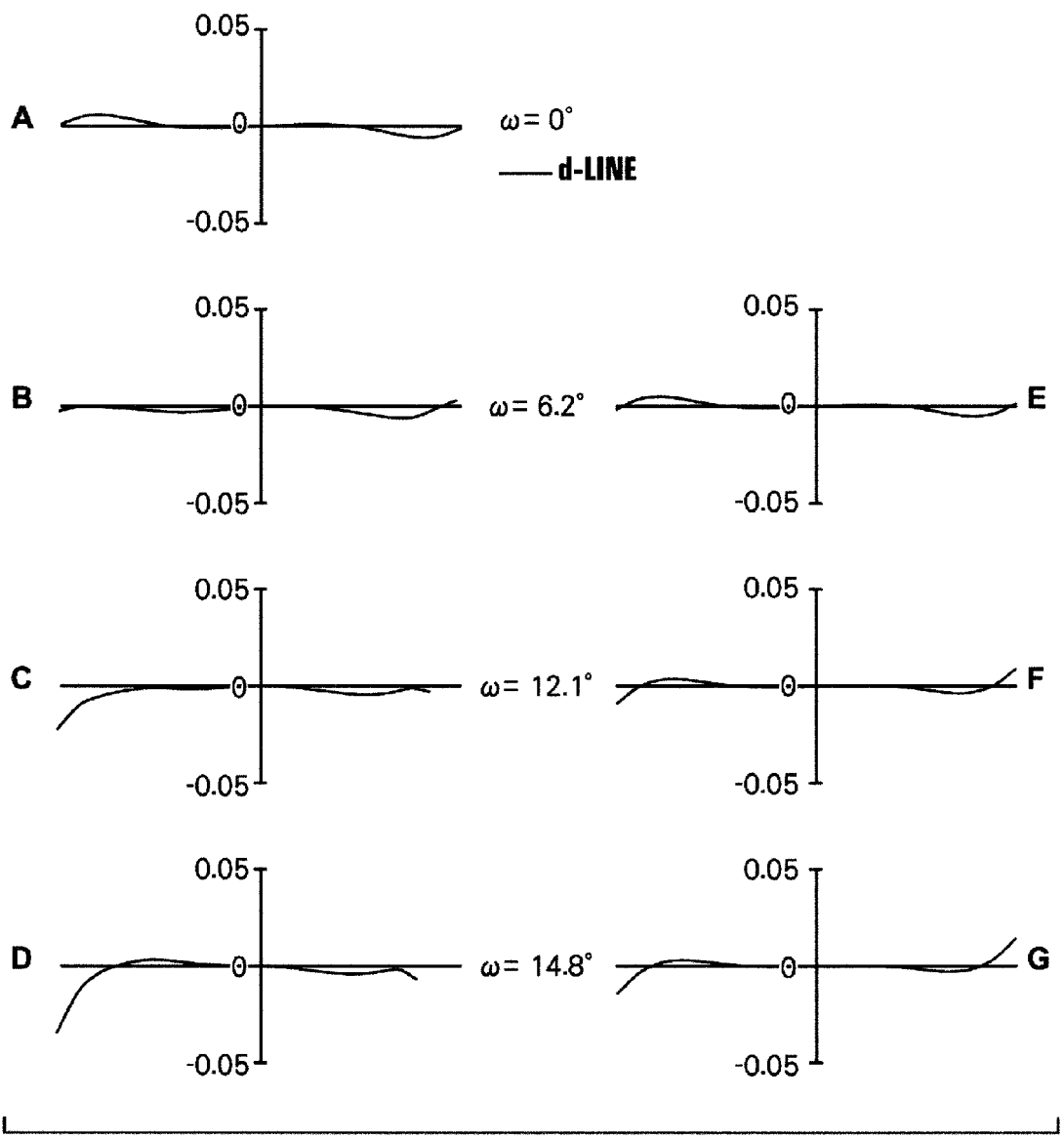
FIG. 19 shows coma aberration diagrams of the zoom lens according to Example 1 of the present invention (intermediate area).
Figure 20:
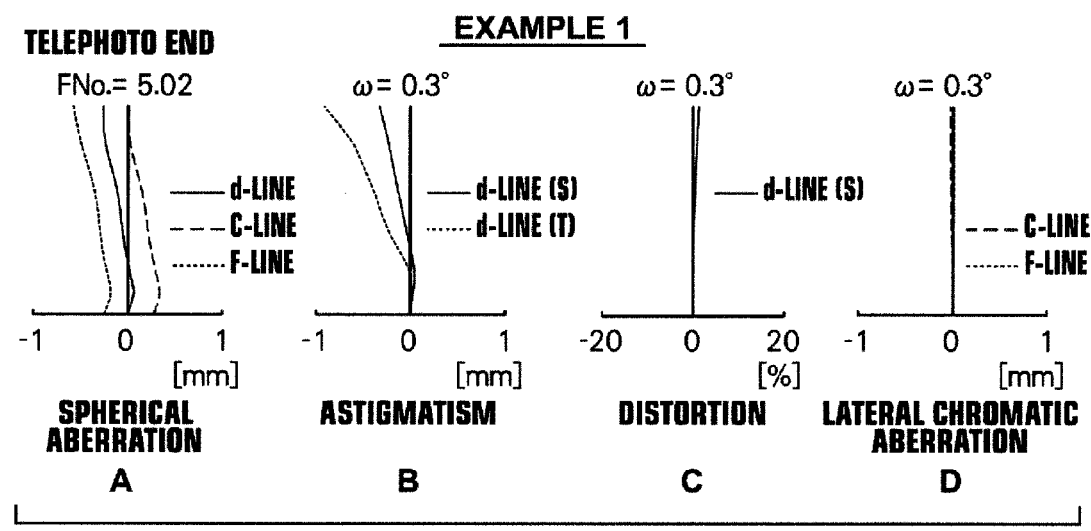
FIG. 20 shows various aberration diagrams of the zoom lens according to Example 1 of the present invention (telephoto end).
Figure 21:
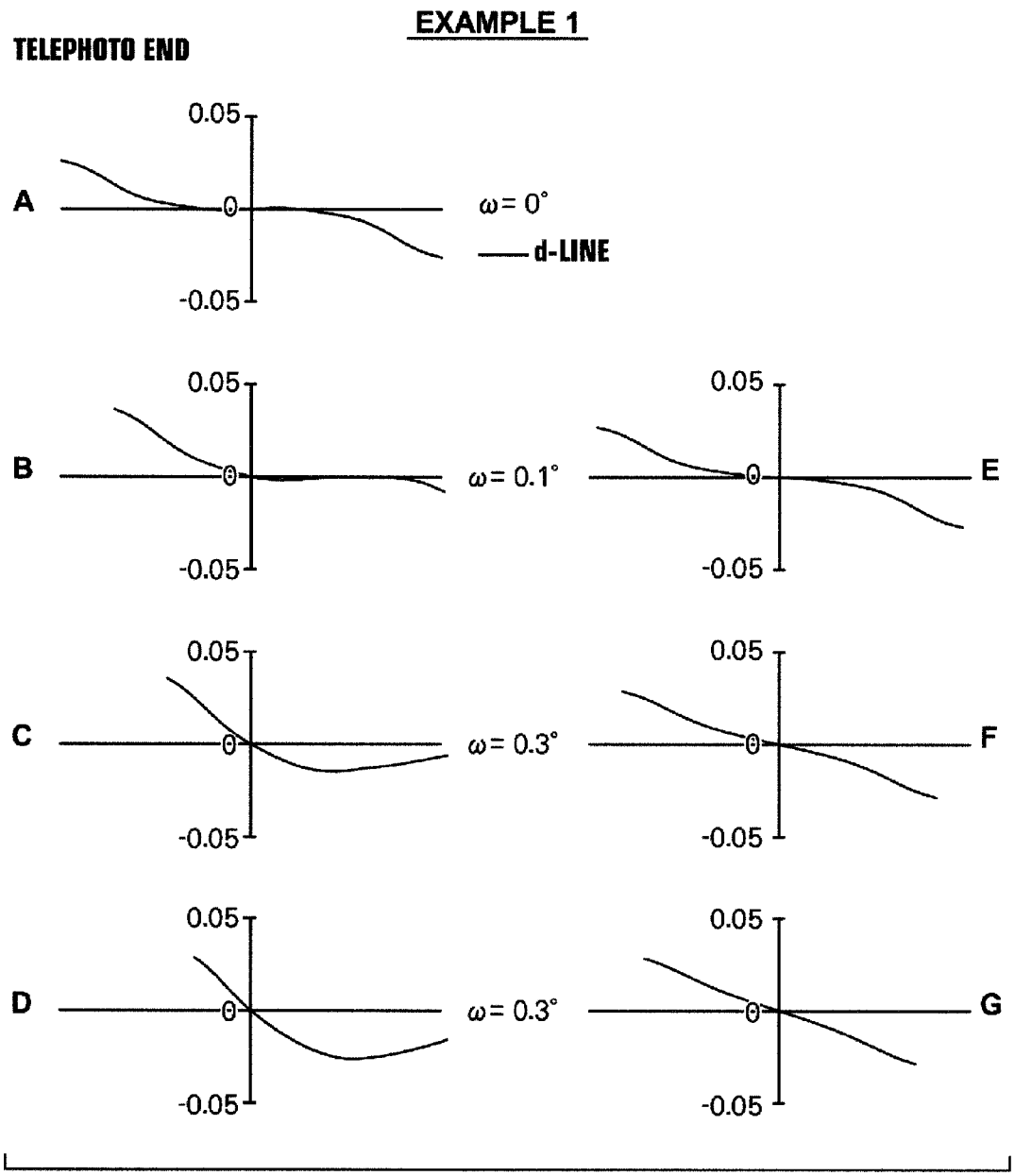
FIG. 21 shows coma aberration diagrams of the zoom lens according to Example 1 of the present invention (telephoto end).

A through D of FIG. 16 respectively show aberration diagrams of spherical aberration, astigmatism, distortion, and lateral chromatic aberration of the zoom lens according to Example 1 at the wide angle end in a state focused on infinity. A through G of FIG. 17 shows comatic aberration diagrams. A through D of FIG. 18 respectively show aberration diagrams of spherical aberration, astigmatism, distortion, and lateral chromatic aberration of the zoom lens according to Example 1 at the intermediate area in a state focused on infinity. A through G of FIG. 19 shows comatic aberration diagrams. A through D of FIG. 20 respectively show aberration diagrams of spherical aberration, astigmatism, distortion, and lateral chromatic aberration of the zoom lens according to Example 1 at the telephoto end in a state focused on infinity. A through G of FIG. 21 shows comatic aberration diagrams. Note that in the comatic aberration, each of A through D of comatic aberration diagrams shows comatic aberration at a half angle of view in a tangential direction, and each of E through G thereof shows comatic aberration at a half angle of view in a saggital direction.

Each of the aberration diagrams shows aberration with respect to the d-line (587.6 nm) which is the reference wavelength. The spherical aberration diagram also shows aberration with respect to a wavelength of 486.1 nm (the F-line) and aberration with respect to a wavelength of 656.3 nm (the C-line). The astigmatism diagram shows aberration in a sagittal direction with a solid line and aberration in a tangential direction with a broken line. The lateral chromatic aberration diagram shows aberration with respect to the C-line and aberration with respect to the F-line. mm is used as the unit of the scale of the vertical axis in each of the comatic aberration diagrams, but the descriptions thereof are omitted in the Figures. The comatic aberration diagram shows aberration with respect to the d-line. FNo. shows a F value, and ω shows a half angle of view.

Figure 22:
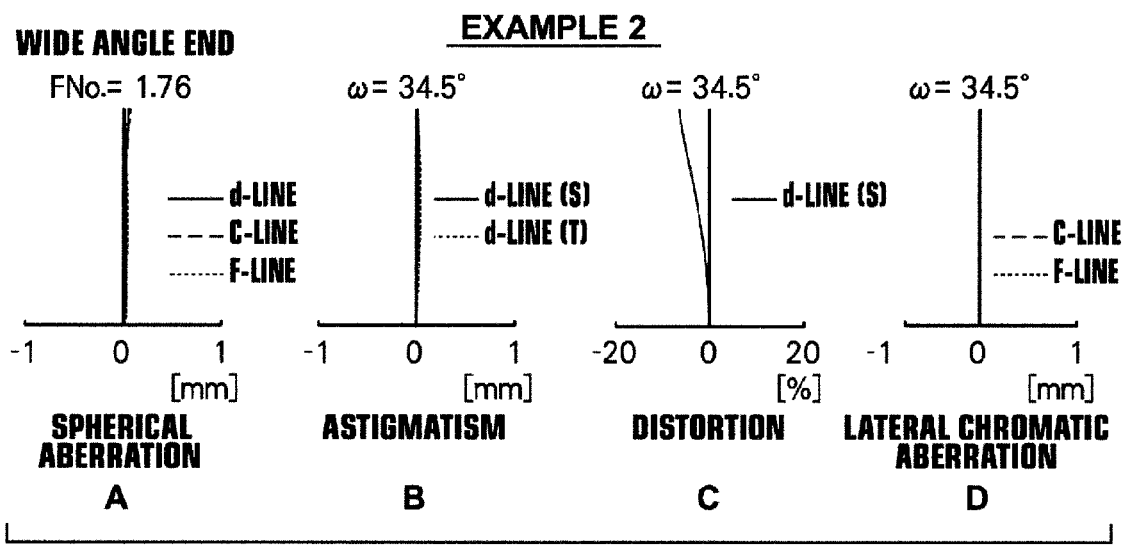
FIG. 22 shows various aberration diagrams of the zoom lens according to Example 2 of the present invention (wide angle end).
Figure 23:
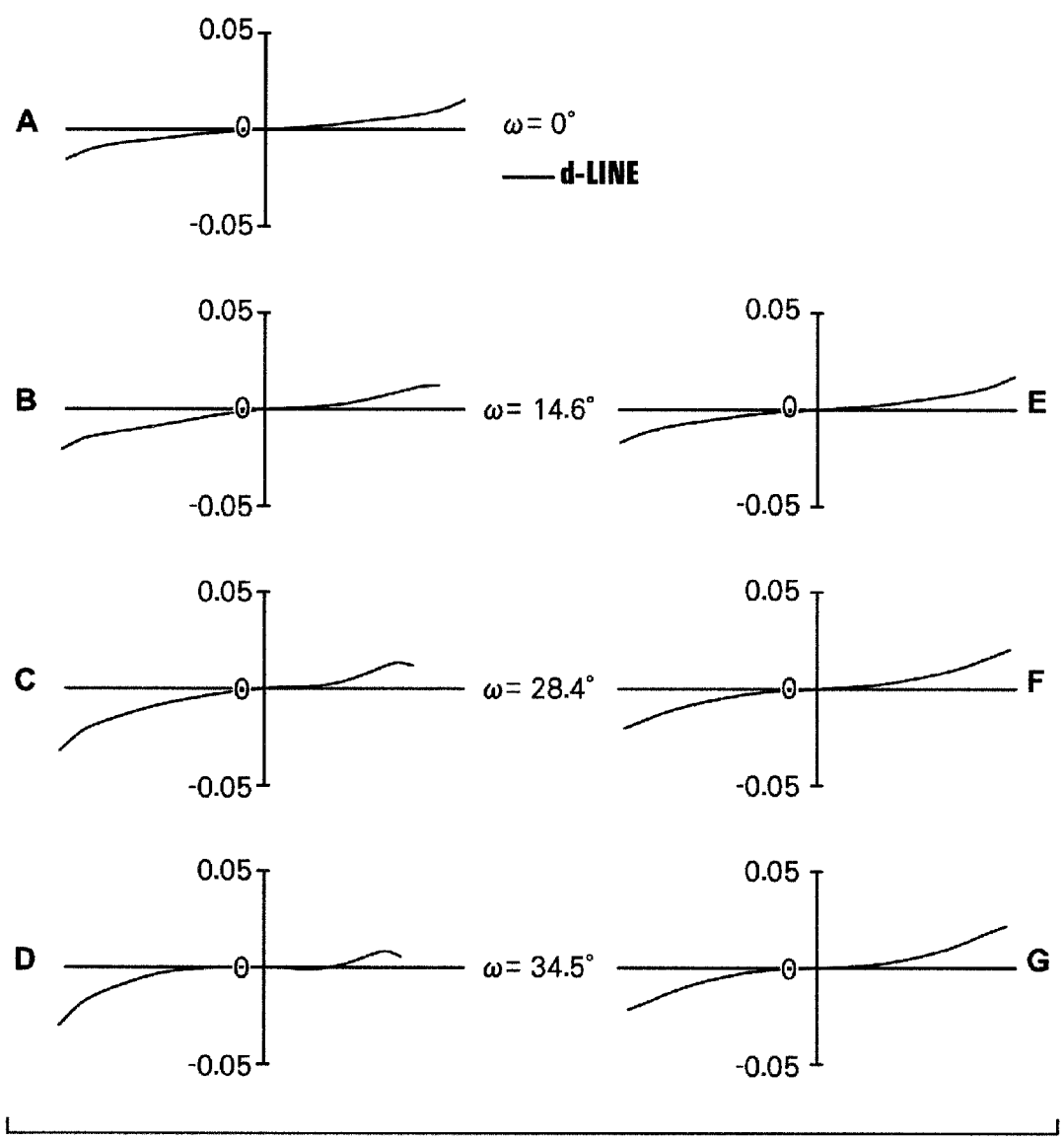
FIG. 23 shows coma aberration diagrams of the zoom lens according to Example 2 of the present invention (wide angle end).
Figure 24:
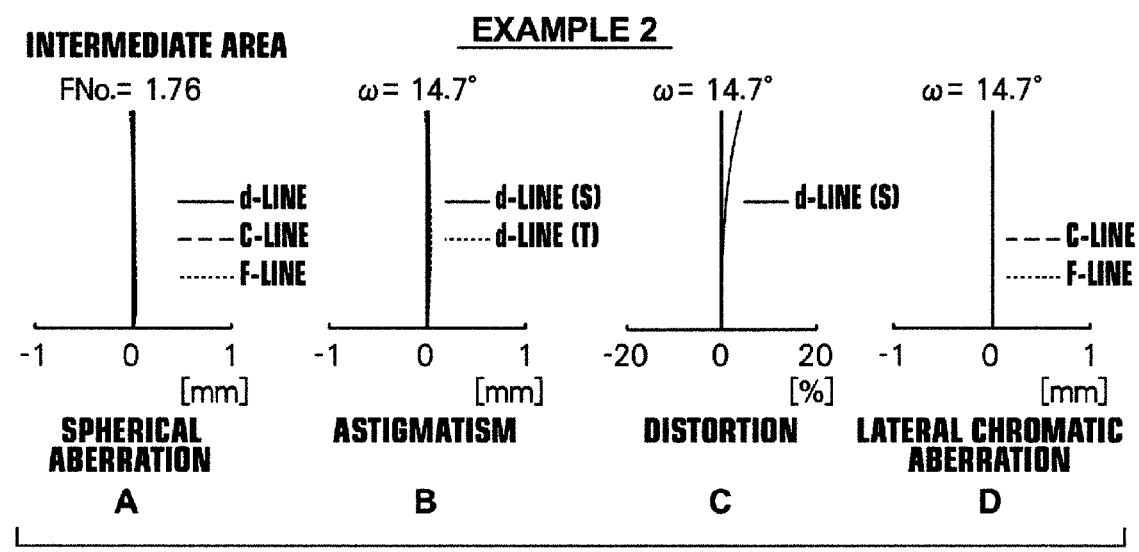
FIG. 24 shows various aberration diagrams of the zoom lens according to Example 2 of the present invention (intermediate area).
Figure 25:
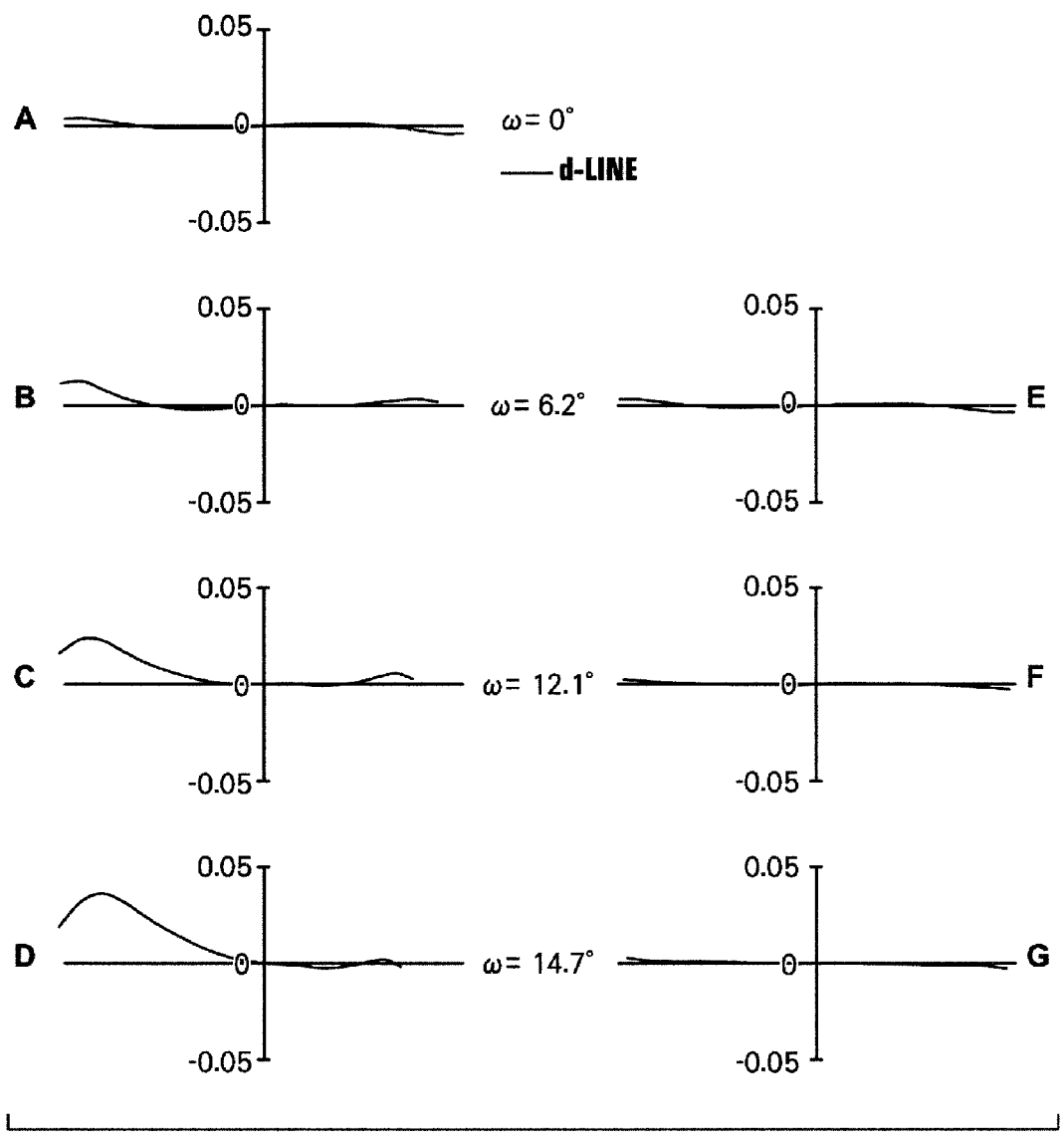
FIG. 25 shows coma aberration diagrams of the zoom lens according to Example 2 of the present invention (intermediate area).
Figure 26:
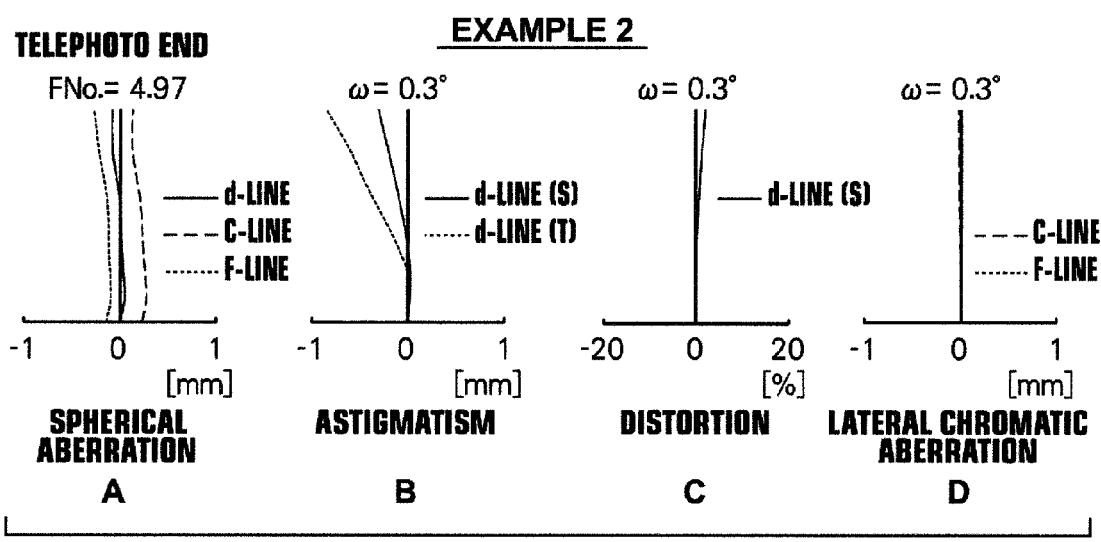
FIG. 26 shows various aberration diagrams of the zoom lens according to Example 2 of the present invention (telephoto end).
Figure 27:
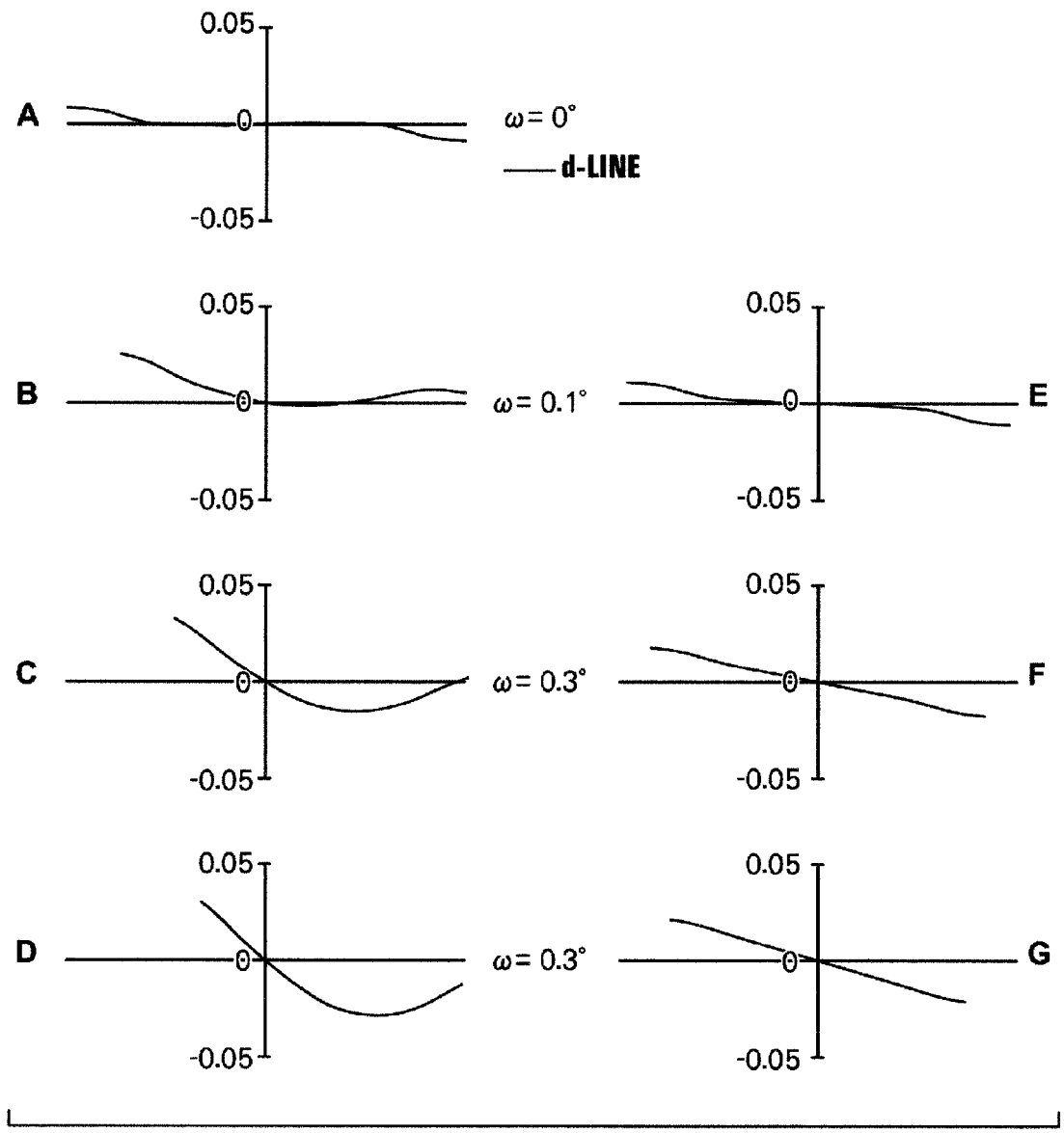
FIG. 27 shows coma aberration diagrams of the zoom lens according to Example 2 of the present invention (telephoto end).

Similarly, various aberration diagrams of the zoom lens according to Example 2 at the wide angle end in a state focused on infinity are shown in A through D of FIG. 22, and comatic aberrations thereof are shown in A through G of FIG. 23. Various aberration diagrams of the zoom lens according to Example 2 at the intermediate area in a state focused on infinity are shown in A through D of FIG. 24, and comatic aberrations thereof are shown in A through G of FIG. 25. Various aberration diagrams of the zoom lens according to Example 2 at the telephoto end in a state focused on infinity are shown in A through D of FIG. 26, and comatic aberrations thereof are shown in A through G of FIG. 27.

Figure 28:
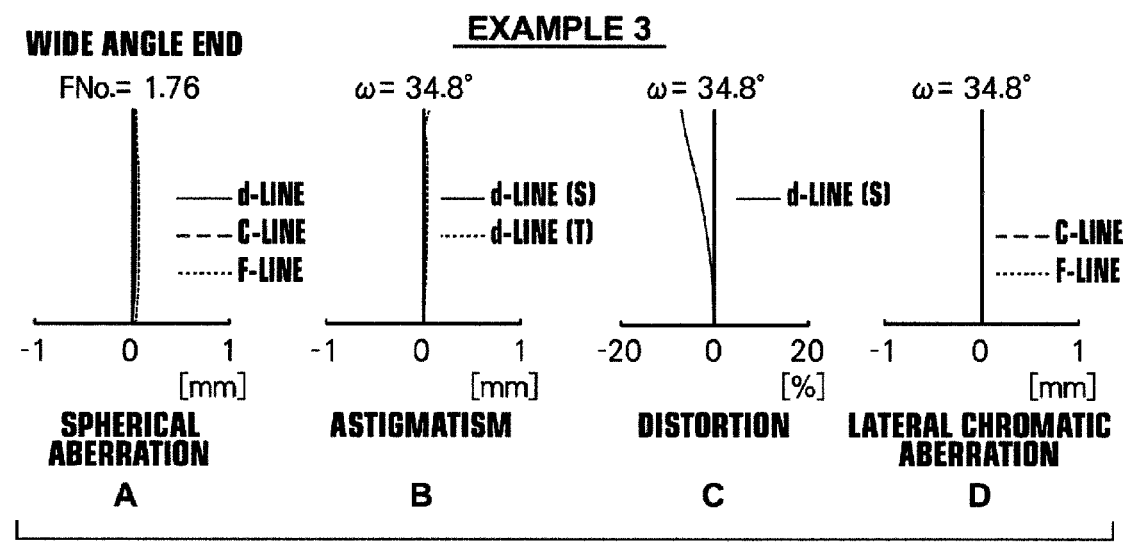
FIG. 28 shows various aberration diagrams of the zoom lens according to Example 3 of the present invention (wide angle end).
Figure 29:
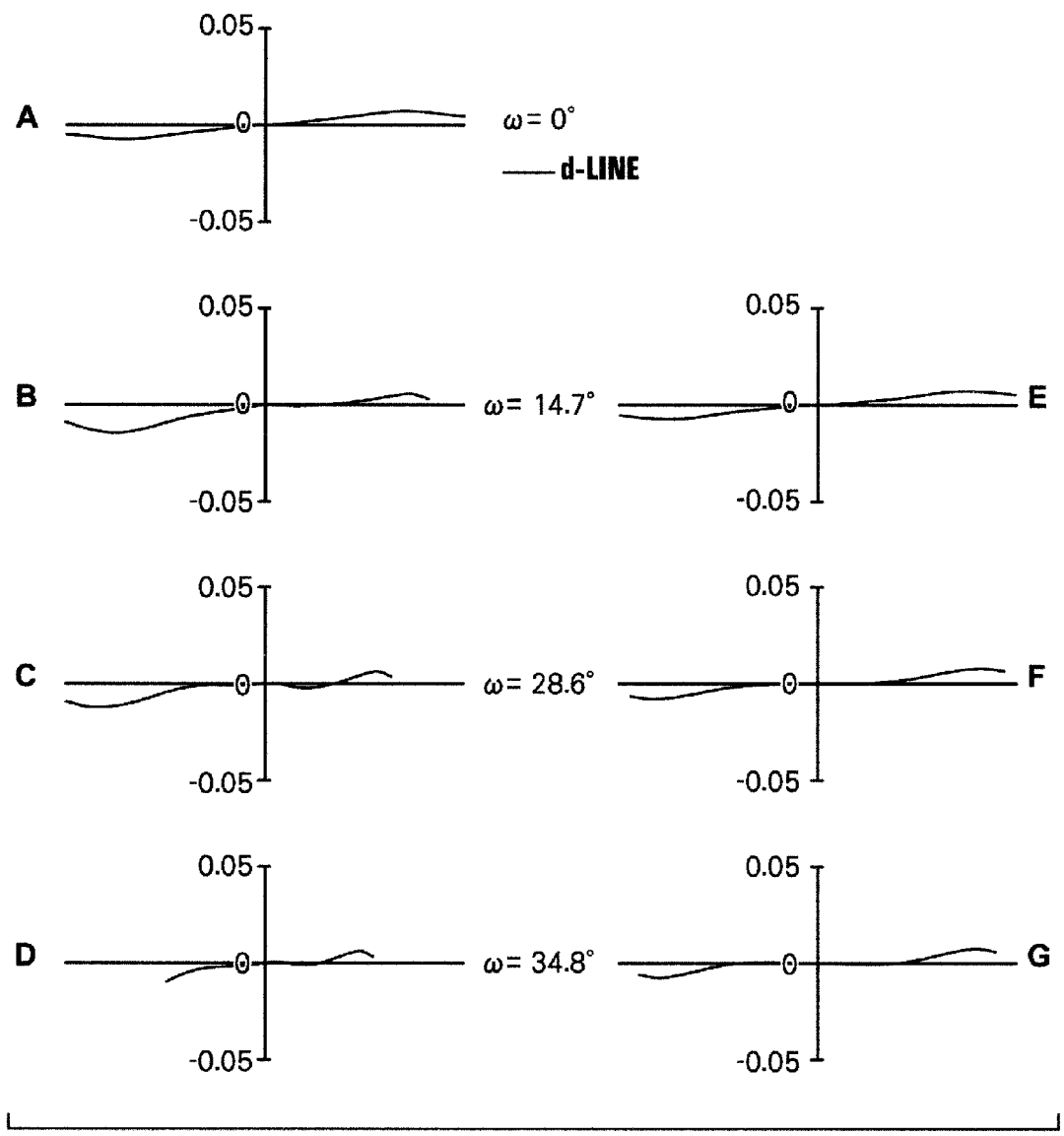
FIG. 29 shows coma aberration diagrams of the zoom lens according to Example 3 of the present invention (wide angle end).
Figure 30:
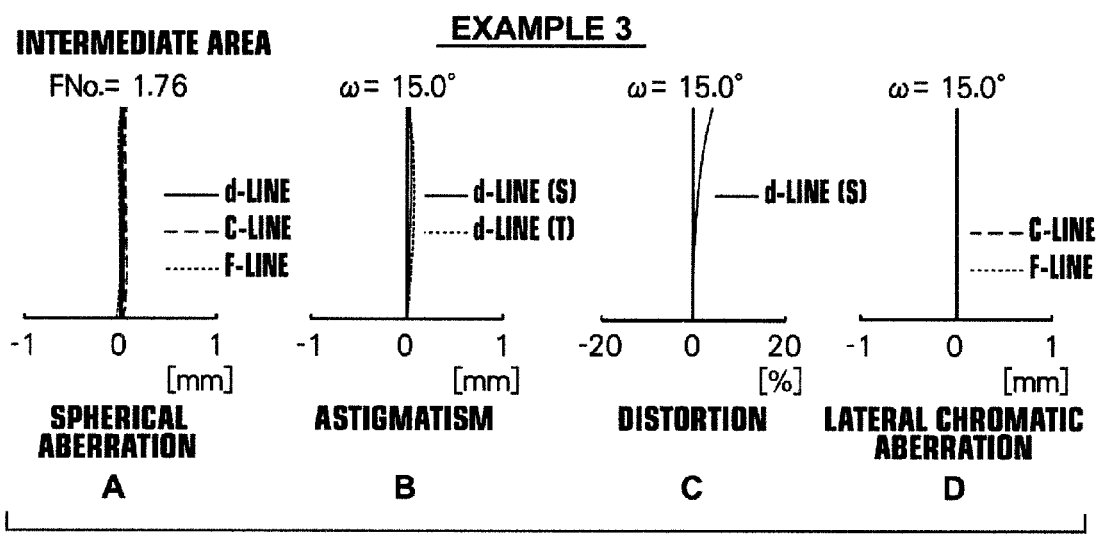
FIG. 30 shows various aberration diagrams of the zoom lens according to Example 3 of the present invention (intermediate area).
Figure 31:
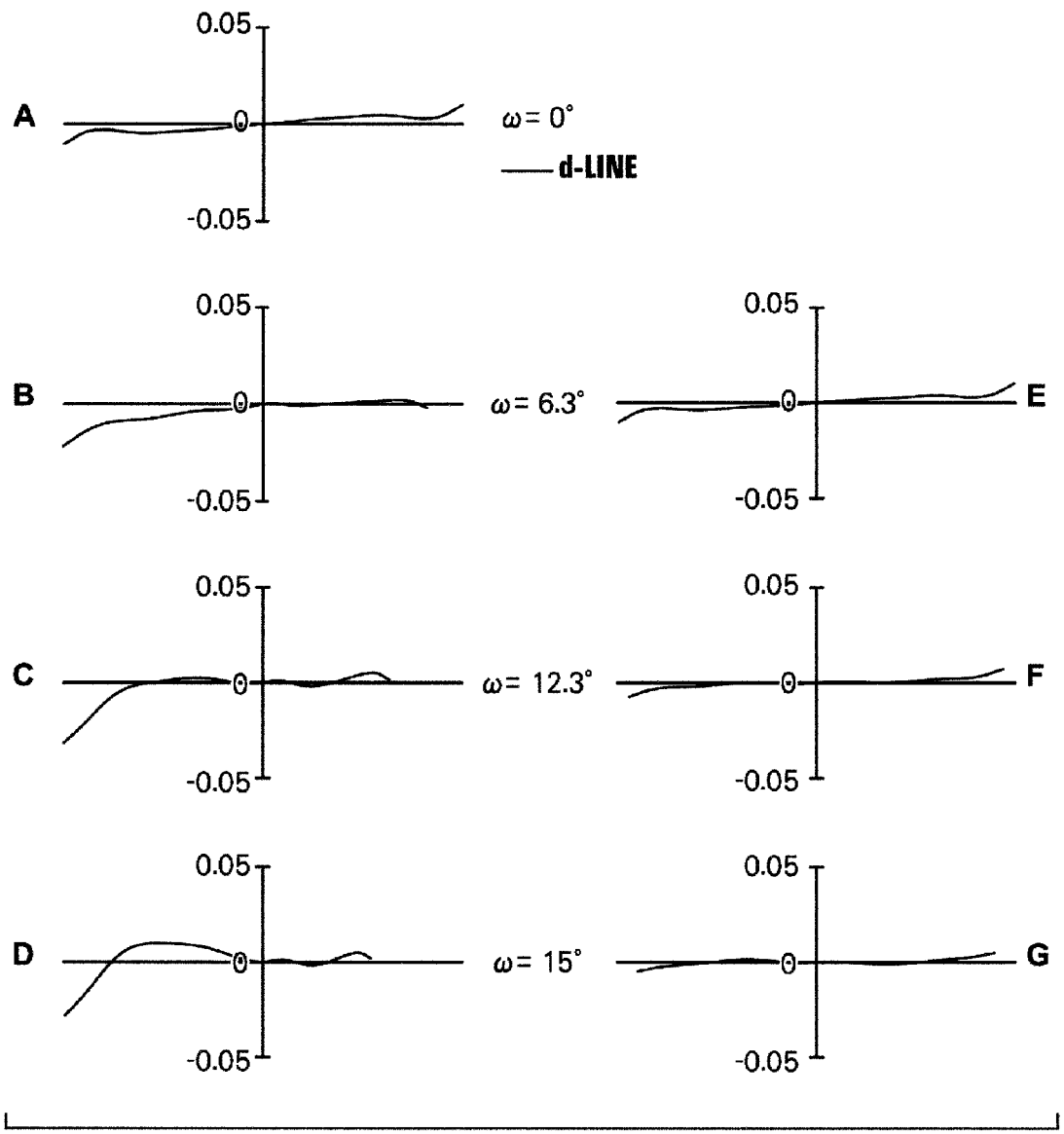
FIG. 31 shows coma aberration diagrams of the zoom lens according to Example 3 of the present invention (intermediate area).
Figure 32:
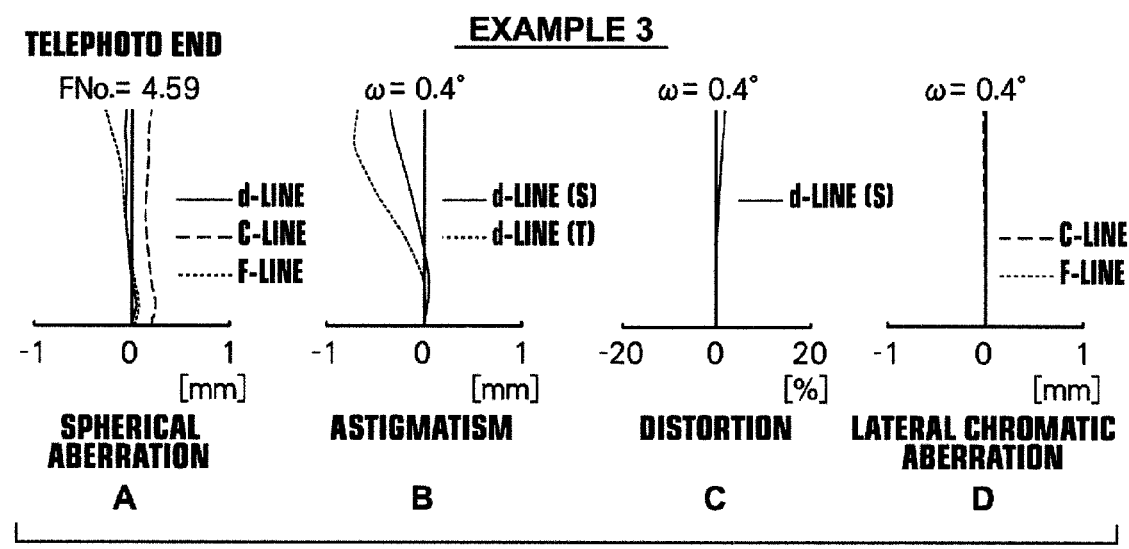
FIG. 32 shows various aberration diagrams of the zoom lens according to Example 3 of the present invention (telephoto end).
Figure 33:
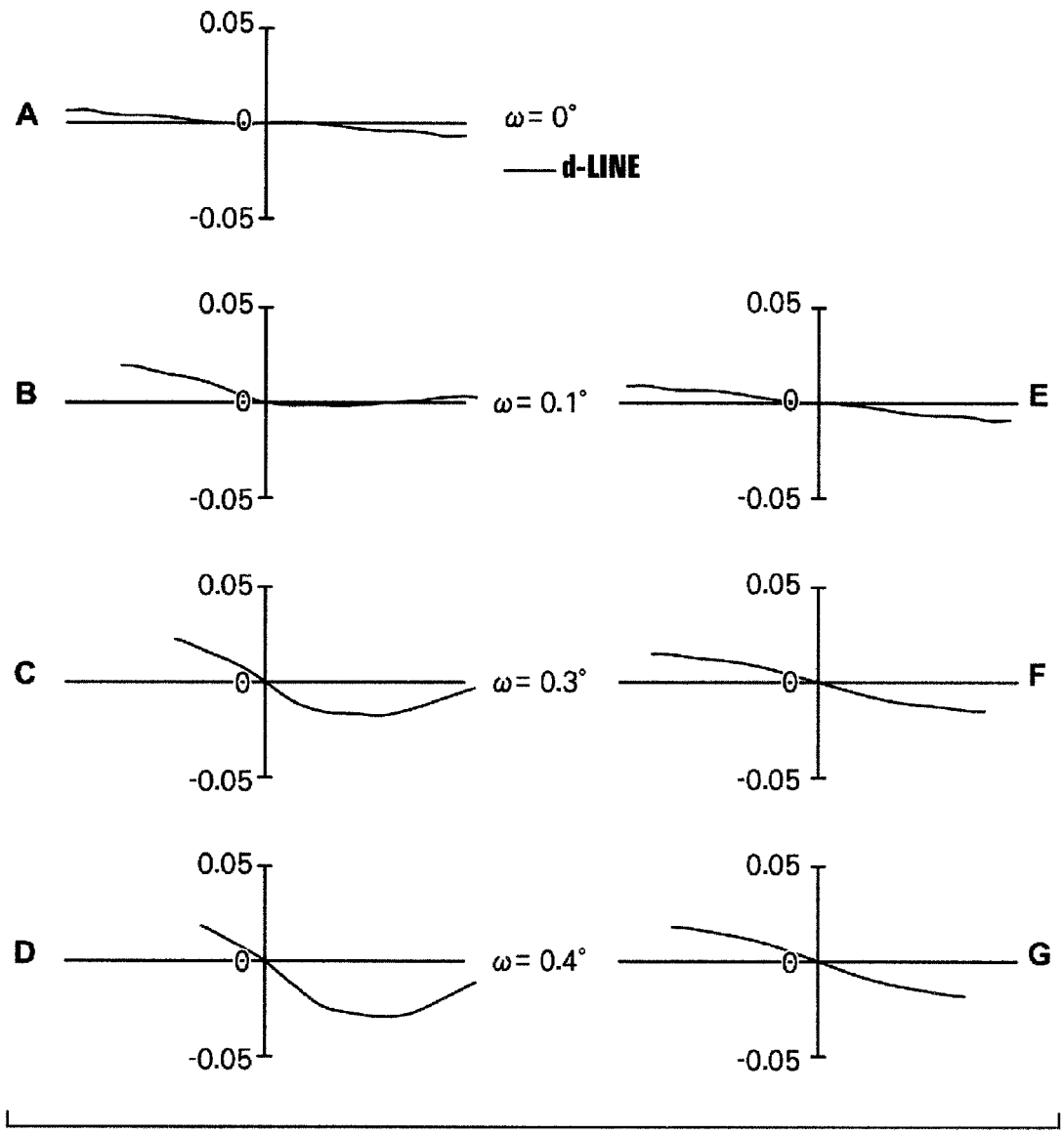
FIG. 33 shows coma aberration diagrams of the zoom lens according to Example 3 of the present invention (telephoto end).

Similarly, various aberration diagrams of the zoom lens according to Example 3 at the wide angle end in a state focused on infinity are shown in A through D of FIG. 28, and comatic aberrations thereof are shown in A through G of FIG. 29. Various aberration diagrams of the zoom lens according to Example 3 at the intermediate area in a state focused on infinity are shown in A through D of FIG. 30, and comatic aberrations thereof are shown in A through G of FIG. 31. Various aberration diagrams of the zoom lens according to Example 3 at the telephoto end in a state focused on infinity are shown in A through D of FIG. 32, and comatic aberrations thereof are shown in A through G of FIG. 33.

As can be seen from each data of Numerical values and each aberration diagram described above, each of the zoom lenses according to Examples 1 through 3 is a lens system which can achieve miniaturization, has high magnification ratio of 100× or more, and has the F number of 1.76 at the wide angle end which is fast. Further, in the zoom lens, each aberration is satisfactorily corrected, and fluctuation in aberrations such as spherical aberration and comatic aberration is suppressed while changing magnification from the wide angle end to the telephoto end.

[Embodiment of the Imaging Apparatus]

Figure 34:
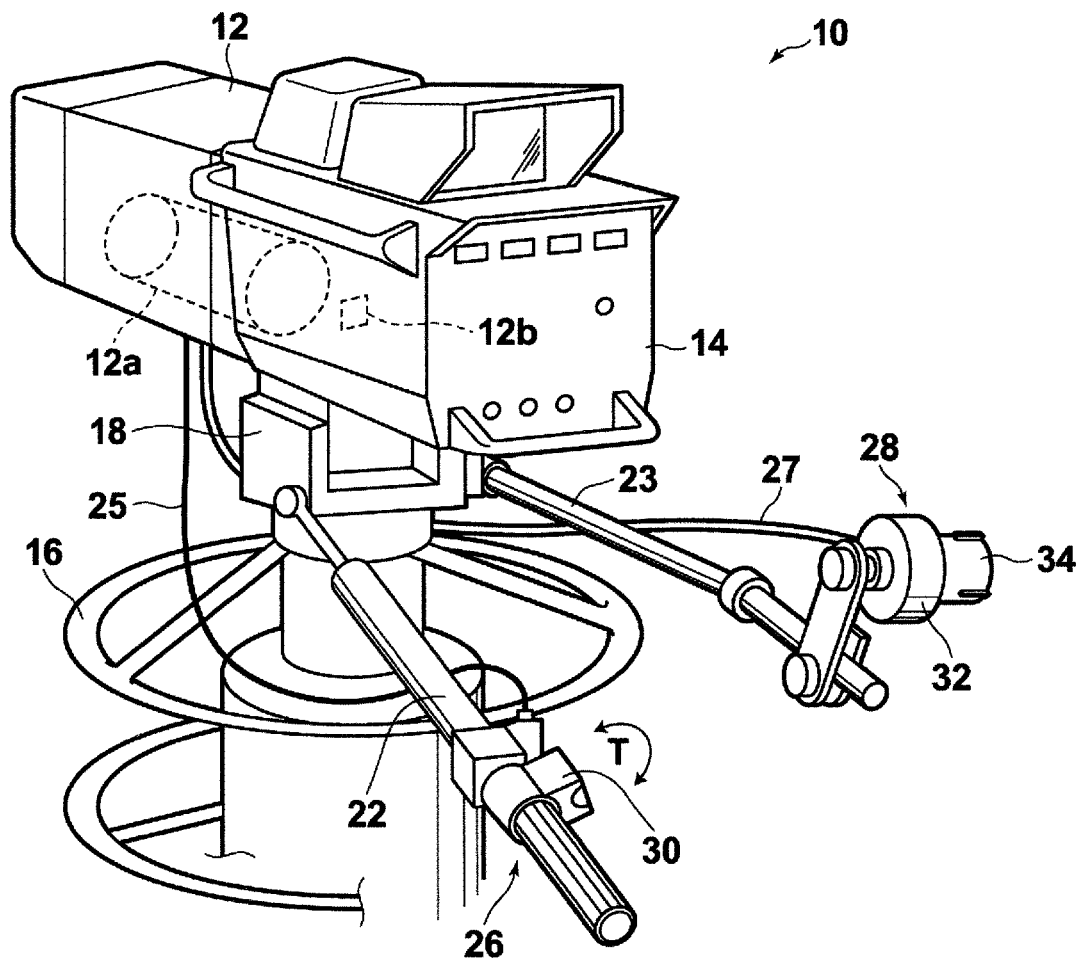
FIG. 34 is a perspective view of the imaging apparatus according to the embodiments of the present invention.

Next, the embodiment of the imaging apparatus of the present invention will be described. FIG. 34 is a perspective view of a television camera 10 which is one embodiment of the imaging apparatus of the present invention. The television camera 10 shown in FIG. 34 is constituted by a lens apparatus 12 and a camera body 14. The lens apparatus 12 is equipped with the zoom lens 12a according to the embodiment of the present invention and an imaging element 12b which images an image of a subject formed by the zoom lens 12a. Note that FIG. 34 schematically shows the zoom lens 12a.

The television camera 10 is movably supported by a camera platform 18 disposed at an upper portion of a pedestal dolly 16 in panning and tilting directions. Two panning rods 22 and 23 by which a photographer operates the camera with both hands extend backward from the camera platform 18. A zoom demand 26 connected to the lens apparatus 12 via a cable 25 is attached to the end part of the panning rod 22. A focus demand 28 connected to the lens apparatus via a cable 27 is attached to the end part of the panning rod 23.

The zoom demand 26 is provided with a thumb ring 30 which is capable of rotatably moving in both directions from the reference position. If the thumb ring 30 is rotatably operated by the photographer, a zoom instruction signal according to the amount of operation from the reference position, i.e., the rotation direction and the amount of rotation is supplied from the zoom demand 26 to the lens apparatus 12. Then, the zoom lens 12a of the lens apparatus 12 will be zoomed to the wide angle side or the telephoto side. Thereby, zooming is performed by a manual operation.

In contrast, a focus ring (rotatably movable operation member) 34 is rotatably provided on a body 32 of the focus demand 28 which is fixed to the panning rod 23. If the focus ring 34 is rotatably operated by the photographer, a focus instruction signal according to the amount of operation, i.e., the rotation direction and the amount of rotation is supplied from the focus demand 28 to the lens apparatus 12. Then, the focus lens of the lens apparatus 12 will move to the close distance side or the infinity side. Thereby, focusing is performed by a manual operation.

As described above, the zoom lens 12a according to the embodiment of the present invention is a lens having favorable optical performance while achieving miniaturization, wider angle of view, and high magnification, in which fluctuations in spherical aberration and comatic aberration while changing magnification are suppressed. The television camera 10 mounted with the zoom lens 12a can be configured to be compact, have high magnification and be capable of forming vivid images on the imaging surface of the imaging element 12b thereof. Accordingly, wider angle of view can be achieved while having high magnification and maintaining high-vision quality.

As described above, the present invention has been described with reference to the Embodiments and Examples. The present invention is not limited to the embodiments and the examples described above, and various modifications are possible. For example, values, such as the radius of curvature, the distances between surfaces, the refractive indices, and the like are not limited to the values in the numerical examples, but may be other values.

Further, a television camera was described as an example of the imaging apparatus in the embodiment described above. The present invention is not limited to such a television camera. For example, the zoom lens of the present invention can be applied for use in other imaging apparatuses such as a video camera, a surveillance camera, and the like.

What is claimed is:

1. A zoom lens substantially consisting of:
a first lens group having a positive refractive power, which is fixed while changing magnification;
a second lens group having a negative refractive power, which moves from the object side to the image side while changing magnification from the wide angle end to the telephoto end;
a third lens group having a positive refractive power, which moves while changing magnification;
a fourth lens group having a positive refractive power, which moves from the image side to the object side while changing magnification from the wide angle end to the telephoto end; and
a fifth lens group having a positive refractive power, which is fixed while changing magnification; wherein
the third lens group and the fourth lens group move relative to each other while changing magnification;
image formation magnification rates of a combined lens group formed by combining the third lens group and the fourth lens group together and the second lens group simultaneously pass a −1× point when changing magnification from the wide angle end to the telephoto end; and
conditional formula (1) below is satisfied:

$$(Dg34max - Dg34min)/fw > 2.5 \qquad (1),\text{ where}$$

fw: the focal length at the wide angle end,
Dg34max: the maximum value of the distance between the third lens group and the fourth lens group while changing magnification, and
Dg34min: the minimum value of the distance between the third lens group and the fourth lens group while changing magnification.

2. The zoom lens of claim 1, wherein conditional formula (1-1) below is satisfied:

$$(Dg34max - Dg34min)/fw > 3.0 \qquad (1\text{-}1),\text{ where}$$

fw: the focal length at the wide angle end,
Dg34max: the maximum value of the distance between the third lens group and the fourth lens group while changing magnification, and
Dg34min: the minimum value of the distance between the third lens group and the fourth lens group while changing magnification.

3. The zoom lens of claim 1, wherein conditional formula (2) below is satisfied:

$$(Dg34max - Dg34min)/f3 > 0.10 \qquad (2),\text{ where}$$

f3: the focal length of the third lens group,
Dg34max: the maximum value of the distance between the third lens group and the fourth lens group while changing magnification, and
Dg34min: the minimum value of the distance between the third lens group and the fourth lens group while changing magnification.

4. The zoom lens of claim 3, wherein conditional formula (2-1) below is satisfied:

$$(Dg34max - Dg34min)/f3 > 0.15 \qquad (2\text{-}1),\text{ where}$$

f3: the focal length of the third lens group,
Dg34max: the maximum value of the distance between the third lens group and the fourth lens group while changing magnification, and
Dg34min: the minimum value of the distance between the third lens group and the fourth lens group while changing magnification.

5. The zoom lens of claim 1, wherein the distance between the third lens group and the fourth lens group becomes maximum at a point more toward the wide angle side than a point where the image formation magnification ratio of the combined lens group becomes −1× while changing magnification.

6. The zoom lens of claim 1, wherein the distance between the third lens group and the fourth lens group becomes minimum at the telephoto end.

7. The zoom lens of claim 1, wherein at least one surface of a lens which constitutes the third lens group is an aspherical surface.

8. The zoom lens of claim 1, wherein the most-image-side lens is an aspherical surface lens among lenses which constitute the fourth lens group.

9. The zoom lens of claim 1, wherein the first lens group substantially consists of a first lens having a negative refractive power, a second lens having a positive refractive power, a third lens having a positive refractive power, a fourth lens having a positive refractive power, and a fifth lens having a positive meniscus lens shape with a convex surface toward the object side.

10. The zoom lens of claim 1, wherein the most-object-side lens has a negative refractive power among lenses which constitute the second lens group.

11. The zoom lens of claim 1, wherein the third lens group substantially consists of one lens having a positive refractive power.

12. The zoom lens of claim 1, wherein the fourth lens group substantially consists of three or more lenses having positive refractive powers and one or more lenses having negative refractive powers.

13. The zoom lens of claim 1, wherein the object-side surface of the most-object-side lens among lenses which constitute the second lens group is an aspherical surface.

14. An imaging apparatus comprising:
the zoom lens of claim 1.

* * * * *